US010975257B2

(12) United States Patent
Kiyoto et al.

(10) Patent No.: US 10,975,257 B2
(45) Date of Patent: *Apr. 13, 2021

(54) INK COMPOSITION AND IMAGE FORMING METHOD

(71) Applicant: FUJIFILM Corporation, Tokyo (JP)

(72) Inventors: Naoharu Kiyoto, Kanagawa (JP); Kosuke Watanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 303 days.

This patent is subject to a terminal disclaimer.

(21) Appl. No.: 16/111,414

(22) Filed: Aug. 24, 2018

(65) Prior Publication Data

US 2018/0362789 A1 Dec. 20, 2018

Related U.S. Application Data

(63) Continuation of application No. PCT/JP2016/088996, filed on Dec. 27, 2016.

(30) Foreign Application Priority Data

| Feb. 29, 2016 | (JP) | JP2016-037731 |
|---|---|---|
| May 30, 2016 | (JP) | JP2016-107303 |

(51) Int. Cl.

| *C09D 11/38* | (2014.01) |
| *C09D 11/322* | (2014.01) |
| *B41J 2/01* | (2006.01) |
| *C08K 3/08* | (2006.01) |
| *C08K 5/378* | (2006.01) |
| *C09D 11/08* | (2006.01) |
| *C09D 11/52* | (2014.01) |
| *B41M 5/00* | (2006.01) |

(52) U.S. Cl.
CPC .............. *C09D 11/38* (2013.01); *B41J 2/01* (2013.01); *B41M 5/00* (2013.01); *C08K 3/08* (2013.01); *C08K 5/378* (2013.01); *C09D 11/08* (2013.01); *C09D 11/322* (2013.01); *C09D 11/52* (2013.01); *C08K 2003/0806* (2013.01); *C08K 2003/0831* (2013.01); *C08K 2201/001* (2013.01); *C08K 2201/003* (2013.01); *C08K 2201/016* (2013.01)

(58) Field of Classification Search
None
See application file for complete search history.

(56) References Cited

U.S. PATENT DOCUMENTS

| 2004/0151894 | A1 | 8/2004 | Kado et al. | |
|---|---|---|---|---|
| 2006/0266157 | A1 | 11/2006 | Takata et al. | |
| 2007/0076069 | A1* | 4/2007 | Edwards | C09D 11/322 347/100 |
| 2008/0145628 | A1 | 6/2008 | Oyanagi et al. | |
| 2008/0250970 | A1 | 10/2008 | Oyanagi et al. | |
| 2009/0054534 | A1 | 2/2009 | Kitamura | |
| 2009/0246358 | A1* | 10/2009 | Winkel | C09D 5/24 427/98.5 |
| 2010/0261827 | A1 | 10/2010 | Peri et al. | |
| 2011/0039078 | A1* | 2/2011 | Brennan Fournet | B82Y 30/00 428/195.1 |
| 2011/0054088 | A1 | 3/2011 | Oyanagi et al. | |
| 2011/0240905 | A1 | 10/2011 | Funakubo et al. | |
| 2011/0281032 | A1 | 11/2011 | Kagata et al. | |
| 2012/0040156 | A1* | 2/2012 | Ohashi | C09D 11/38 428/207 |
| 2012/0301639 | A1* | 11/2012 | Grigorenko | C09D 7/68 428/29 |
| 2013/0071651 | A1* | 3/2013 | Hakuta | C03C 17/34 428/333 |
| 2013/0079453 | A1 | 3/2013 | Kraiter et al. | |
| 2013/0122281 | A1* | 5/2013 | Hakuta | G02B 5/206 428/323 |
| 2013/0260139 | A1* | 10/2013 | Kamada | C03C 17/007 428/328 |
| 2014/0004338 | A1* | 1/2014 | Kiyoto | G02B 5/206 428/328 |
| 2014/0272386 | A1* | 9/2014 | Kiyoto | C03C 17/366 428/328 |
| 2016/0001362 | A1 | 1/2016 | Lee et al. | |
| 2017/0199185 | A1* | 7/2017 | Miyazawa | G01N 33/54346 |
| 2018/0348406 | A1* | 12/2018 | Matsuno | G02B 1/11 |
| 2018/0362790 | A1* | 12/2018 | Watanabe | C08K 3/08 |
| 2019/0079087 | A1* | 3/2019 | Miyazawa | G01N 33/54313 |
| 2019/0359837 | A1* | 11/2019 | Harada | C09D 11/08 |
| 2019/0359840 | A1* | 11/2019 | Kiyoto | C09D 11/322 |
| 2020/0181434 | A1* | 6/2020 | Harada | B82Y 30/00 |
| 2020/0181435 | A1* | 6/2020 | Harada | C09D 7/70 |

FOREIGN PATENT DOCUMENTS

| CN | 1492008 A | 4/2004 |
|---|---|---|
| CN | 101204877 A | 6/2008 |
| CN | 101415784 A | 4/2009 |
| CN | 102002279 A | 4/2011 |
| CN | 102933990 A | 2/2013 |

(Continued)

OTHER PUBLICATIONS

English translation of JP 2008/174712, dated Jul. 2008; 32 pages.*
English translation of JP 2011/252213, dated Dec. 2011; 26 pages.*
English translation of KR 2014/0098922, dated Aug. 2014; 18 pages.*
English translation of JP 2014/184688, dated Oct. 2014; 69 pages.*
Communication dated Dec. 6, 2018 from the European Patent Office in application No. 16892752.3•.
Communication dated Dec. 18, 2018 from the Japanese Patent Office in application No. 2018-502544•.

(Continued)

Primary Examiner — Helene Klemanski
(74) Attorney, Agent, or Firm — Sughrue Mion, PLLC

(57) ABSTRACT

Provided is an ink composition used for image formation by an ink jet method. The ink composition includes plate-like metal particles and an organic solvent having a boiling point of 150° C. or higher and a solubility parameter of 24 $MPa^{1/2}$ or more. The maximum absorption wavelength of the ink composition in the wavelength range of 300 nm to 2,500 nm is located in the wavelength range of 800 nm to 2,500 nm. Also provided is an image forming method.

17 Claims, No Drawings

(56) References Cited

FOREIGN PATENT DOCUMENTS

| CN | 102959021 A | | 3/2013 |
|---|---|---|---|
| CN | 105050754 A | | 11/2015 |
| JP | 2003-306645 A | | 10/2003 |
| JP | 2003-327889 A | | 11/2003 |
| JP | 2005-105376 A | | 4/2005 |
| JP | 2005-320616 A | | 11/2005 |
| JP | 2008-174712 A | | 7/2008 |
| JP | 2008-523246 A | | 7/2008 |
| JP | 2009-507692 A | | 2/2009 |
| JP | 2009-144188 A | | 7/2009 |
| JP | 2010-540769 A | | 12/2010 |
| JP | 2011-149028 A | | 8/2011 |
| JP | 2011-221149 A | | 11/2011 |
| JP | 2011-252213 A | | 12/2011 |
| JP | 2012-041378 A | | 3/2012 |
| JP | 2012-143871 A | | 8/2012 |
| JP | 2013-512291 A | | 4/2013 |
| JP | 2014/184688 A | * | 10/2014 |
| KR | 1020140098922 A | | 8/2014 |
| WO | 2009130689 A2 | | 10/2009 |
| WO | 2015/129323 A1 | | 9/2015 |

OTHER PUBLICATIONS

Written Opinion of the ISA issued in International Application No. PCT/JP2016/088996 dated Mar. 14, 2017.
International Search Report of PCT/JP2016/088996 dated Mar. 14, 2017.
International Preliminary Report on Patentability issued in International Application No. PCT/JP2016/088996 dated Sep. 4, 2018.
"Ink technical brochure", Printing Industrial Publisher, vol. 1, May 31, 2009, p. 276, (3 pages total).
"Printed Science Technology Practical Book, Part 3", Edition of Printing Equipment, Printing Industry Publisher, May 31, 2008, p. 176, (3 pages total).
Cheng "Applications of Nano-Ink in Electronics Industry", Printed Circuit Information, 2010, pp. 19-22.
Communication dated Nov. 25, 2020 by the China National Intellectual Property Administration in application No. 201680082685.6.

* cited by examiner

INK COMPOSITION AND IMAGE FORMING METHOD

CROSS-REFERENCE TO RELATED APPLICATIONS

This application is a continuation application of International Application No. PCT/JP2016/088996, filed Dec. 27, 2016, the disclosure of which is incorporated herein by reference in its entirety. Further, this application claims priority from Japanese Patent Application No. 2016-037731, filed Feb. 29, 2016, and Japanese Patent Application No. 2016-107303, filed May 30, 2016, the disclosures of which are incorporated herein by reference in their entirety.

BACKGROUND OF THE INVENTION

1. Field of the Invention

The present disclosure relates to an ink composition and an image forming method.

2. Description of the Related Art

Ink compositions containing metal particles have hitherto been known.

For example, there is known an ink composition that includes aluminum, which is employed because it is a relatively inexpensive metal material, that has high preservation stability, and that has a high metallic specular gloss such that its values of specular glossiness at 20°, 60°, and 85° are not less than 200, 200, and 100, respectively. The ink composition includes a pigment dispersion including a metal pigment made of plate-like metal particles, and when the major axis on a plane of the plate-like metal particle is X, the minor axis is Y, and the thickness of the particle is Z, R50, which is a 50% average particle size of an equivalent circle diameter determined from the area of the X-Y plane of the plate-like metal particle, is 0.5 to 3 µm, and the condition R50/Z>5 is satisfied (see, for example, JP2008-174712A).

There is also known an ink composition that can produce a recorded matter having a metallic luster, that has high recording stability, that is usable for a wide variety of media (recording media), and that has high fixability. The ink composition contains a pigment, an organic solvent, and a fixing resin. The pigment is made of metal foil flakes having an average thickness of 30 nm or more and 100 nm or less, a 50% volume average particle size of 1.0 µm or more and 4.0 µm or less, and a maximum particle size in particle size distribution of 12 µm or less (see, for example, JP2011-149028A).

There is also known a coating composition including shaped transition metal particles (pigment) having a longest dimension of edge length of from 20 nm to 500 nm and a thickness of from 4 to 30 nm and a binder. The ratio of pigment to binder is such that the resulting coating shows a variation of color as a function of the viewing angle. Furthermore, this coating composition is known to be a printing ink (see, for example, JP2013-512291A).

There is also known an inkjet ink that enables printing of variable print having a metallic effect. The inkjet ink contains nanoparticles of a noble metal (see, for example, JP2009-507692A).

There is also known an ink that is able to form an image having an excellent metallic luster while also having high fixability to printing media. The ink includes silver particles having an average particle size of 3 nm or more and 100 nm or less (see, for example, JP2012-143871A).

There is also known an ink composition that can be used to form an image having an excellent metallic luster while also having high abrasion resistance. The ink composition includes silver particles having an average particle size of 5 nm or more and 100 nm or less, wax particles, and water (see, for example, JP2012-041378A).

There is also known a conductive ink for ink jet printing, which conductive ink is suitable for use in the formation of electronic circuits and includes a dispersion of silver particles having silver particles with a cubic or tabular morphology. The dispersion of silver particles has a size distribution with a coefficient of variation of up to 0.5 (see, for example, JP2008-523246A).

SUMMARY OF THE INVENTION

However, the ink composition disclosed in JP2008-174712A, which includes aluminum particles as plate-like metal particles, may form an image having reduced specular glossiness due to oxidation of the surface of the aluminum particles. The oxidation of the surface of the aluminum particles and the reduction in the specular glossiness of an image are likely to occur particularly when the ink contains water.

The metal particles contained in the ink compositions disclosed in JP2008-174712A and JP2011-149028A have large particle sizes, and thus the metal particles are poorly dispersed. Thus, when the ink compositions disclosed in JP2008-174712A and JP2011-149028A are applied to the image formation by an ink jet method, clogging of ink jet head nozzles is likely to occur (i.e., the ejectability through ink jet head nozzles is likely to be reduced).

The clogging of ink jet head nozzles is effectively suppressed by decreasing the particle size of metal particles in the ink composition.

However, when the particle size of metal particles in the ink composition is decreased, an image formed may have a tint (specifically, a tint of a chromatic color; hereinafter the same). One possible reason for this is the effect of plasmon resonance due to the decreased particle size of the metal particles.

For example, an image formed using the printing ink disclosed in JP2013-512291A is an image "showing a variation of color as a function of the viewing angle", that is, a metallic image having a tint.

Also when the ink compositions disclosed in JP2009-507692A, JP2012-143871A, and JP2012-041378A are used to form images, the images may have tints (tints of chromatic colors) if the size of metal particles is small.

The conductive ink disclosed in JP2008-523246A is a conductive ink for performing the formation of electronic circuits by an ink jet method and is not an ink for forming an image.

As described above, it has been difficult to form an image that has specular glossiness and is less tinted (i.e., a neutral metallic image) with the ink composition disclosed in JP2013-512291A, JP2009-507692A, JP2012-143871A, JP2012-041378A, or JP2008-523246A.

In addition, the ink compositions disclosed in JP2008-174712A and JP2011-149028A disadvantageously have poor ejectability through ink jet head nozzles, as described above.

The present disclosure has been made in view of the foregoing and aims to provide an ink composition that is able to form an image having specular glossiness and being less tinted and that has high ejectability through ink jet head nozzles and an image forming method.

Specific means for solving the problems described above include the following aspects.

<1> An ink composition used for image formation by an ink jet method, the ink composition containing plate-like metal particles and an organic solvent having a boiling point of 150° C. or higher and a solubility parameter of 24 MPa$^{1/2}$ or more, wherein a maximum absorption wavelength of the ink composition in a wavelength range of 300 nm to 2,500 nm is located in a wavelength range of 800 nm to 2,500 nm.

<2> The ink composition according to <1>, wherein the plate-like metal particles include a metal element having a standard oxidation-reduction potential nobler than −1.65 V.

<3> The ink composition according to <1> or <2>, wherein the plate-like metal particles include at least one metal element selected from the group consisting of gold, silver, and platinum.

<4> The ink composition according to any one of <1> to <3>, wherein the plate-like metal particles include silver in an amount of 80% by mass or more relative to the total amount of the plate-like metal particles.

<5> The ink composition according to any one of <1> to <4>, wherein the plate-like metal particles have an average aspect ratio, which is a ratio of an average equivalent circle diameter to an average thickness, of 10 or more.

<6> The ink composition according to any one of <1> to <5>, wherein the plate-like metal particles have an average equivalent circle diameter of 10 nm to 300 nm.

<7> The ink composition according to any one of <1> to <6>, wherein a content of the plate-like metal particles is 3% to 10% by mass relative to the total amount of the ink composition.

<8> The ink composition according to any one of <1> to <7>, wherein a content of the organic solvent is 5% to 80% by mass relative to the total amount of the ink composition.

<9> The ink composition according to any one of <1> to <8>, wherein a ratio of an absorbance at a wavelength of 500 nm to an absorbance at the maximum absorption wavelength is 0.2 or less.

<10> The ink composition according to any one of <1> to <9>, further containing water.

<11> The ink composition according to <10>, further containing gelatin.

<12> The ink composition according to <11>, wherein a ratio of a mass content of the plate-like metal particles to a mass content of the gelatin is 1 to 100.

<13> The ink composition according to any one of <1> to <12>, wherein the organic solvent is at least one selected from the group consisting of propylene glycol, glycerol, and ethylene glycol.

<14> The ink composition according to any one of <1> to <13>, further containing a silver ion trapping agent having a p$K_{sp}$ of 13 or more, wherein the plate-like metal particles include silver, p$K_{sp}$ being defined by formula (1):

$$pK_{sp} = -\log K_{sp} \quad \text{formula (1)}$$

wherein $K_{sp}$ represents a solubility product of a silver salt at 25° C.

<15> The ink composition according to <14>, wherein the silver ion trapping agent is an organic compound including at least one of a mercapto group or a nitrogen-containing heterocyclic structure.

<16> The ink composition according to any one of <1> to <15>, wherein the ink composition is used for decorative printing by an ink jet method.

<17> An image forming method having an ink application step of applying the ink composition according to any one of <1> to <16> to a substrate by an ink jet method.

The present disclosure provides an ink composition that is able to form an image having specular glossiness and being less tinted and that has high ejectability through an ink jet head and an image forming method.

DESCRIPTION OF THE PREFERRED EMBODIMENTS

Specific embodiments of the present invention will now be described in detail, but the following embodiments are not intended to limit the present invention.

In this specification, every numerical range expressed using " . . . to . . . " indicates a range including the numerical values before and after "to" as the minimum value and the maximum value.

In this specification, if there are two or more substances corresponding to one component in a composition, the amount of the component in the composition means the total amount of the two or more substances in the composition unless otherwise specified.

In this specification, the term "step" encompasses not only a separate step but also a step that is not clearly distinguished from another step if the desired object of the step is achieved.

In this specification, "light" is a concept that encompasses active energy rays such as γ-rays, β-rays, electron beams, ultraviolet radiation, visible radiation, and infrared radiation.

In this specification, "tint" means a tint of a chromatic color (e.g., red, blue, and yellow).

Ink Composition

An ink composition (hereinafter also referred to simply as an "ink") according to the present disclosure contains plate-like metal particles and an organic solvent having a boiling point of 150° C. or higher and a solubility parameter of 24 MPa$^{1/2}$ or more. The maximum absorption wavelength of the ink composition in the wavelength range of 300 nm to 2,500 nm is located in the wavelength range of 800 nm to 2,500 nm.

The ink according to the present disclosure is used for image formation by an ink jet method.

In this specification, "the maximum absorption wavelength in the wavelength range of 300 nm to 2,500 nm" means a wavelength at which absorbance is maximal among wavelengths within the wavelength range of 300 nm to 2,500 nm.

Hereinafter, the maximum absorption wavelength in the wavelength range of 300 nm to 2,500 nm is also referred to simply as "the maximum absorption wavelength".

The ink according to the present disclosure is able to form an image having specular glossiness and being less tinted. In addition, the ink according to the present disclosure has high ejectability through ink jet head nozzles.

In this specification, having high ejectability through ink jet head nozzles means that nozzle clogging can be suppressed when an ink is ejected through ink jet head nozzles.

In this specification, ejectability through ink jet head nozzles may be referred to simply as "ejectability".

The reason why the ink according to the present disclosure provides the benefits described above is presumably as follows. However, the ink according to the present disclosure is not limited by the following reason.

When an image is formed using an ink (e.g., the ink disclosed in JP2013-512291A, JP2009-507692A, JP2012-143871A, or JP2012-041378A) including metal particles having a particle size at a wavelength in the visible range or a lower wavelength, the image formed may have a tint. This is probably due to the following reason.

On metal particles having a particle size at a wavelength in the visible range or a lower wavelength, plasmon resonance occurs. This plasmon resonance may cause the metal particles to absorb light having a particular wavelength in the visible range. As a result of the absorption of light having a particular wavelength in the visible range by the metal particles in an ink, an image formed using the ink has a tint. For example, when the shape of metal particles is cubic or spherical, the metal particles absorb light having a particular wavelength in the visible range, and an image formed has a tint.

With regard to this point, the ink according to the present disclosure has a maximum absorption wavelength in the wavelength range of 800 nm to 2,500 nm (i.e., the near-infrared range). Thus, when an image is formed using the ink according to the present disclosure, the image formed is less tinted.

One possible reason why the maximum absorption wavelength of the ink according to the present disclosure is located in the near-infrared range is that the ink includes plate-like metal particles (i.e., metal particles having a plate-like shape). Plate-like metal particles, if their particle size is small to cause plasmon resonance, have a plasmon resonance absorption wavelength not in the visible range but in the near-infrared range. Thus, the presence of the plate-like metal particles in the ink makes the maximum absorption wavelength of the ink located in the near-infrared range.

In this specification, the tint of an image is evaluated by metric saturation values.

Lower metric saturation values indicate that the image is less tinted.

Because of including plate-like metal particles, the ink according to the present disclosure forms an image having high specular glossiness.

In this specification, the specular glossiness of an image is evaluated by using its 20° gloss value and 60° gloss value and by sensory evaluation (image evaluation by visual observation).

For both the 20° gloss value and the 60° gloss value, higher values indicate that the image has higher specular glossiness.

Because of including an organic solvent having a boiling point of 150° C. or higher and a solubility parameter (SP value) of 24 $MPa^{1/2}$ or more, the ink according to the present disclosure has improved ink ejectability and improved specular glossiness of an image.

Specifically, since the boiling point of the organic solvent is 150° C. or higher, nozzle clogging that might otherwise be caused by vaporization of the organic solvent is suppressed, thus resulting in improved ink ejectability.

Furthermore, since the solubility parameter (SP value) of the organic solvent is 24 $MPa^{1/2}$ or more, the dispersibility and alignment properties of the plate-like metal particles are improved in the ink applied to a substrate (i.e., an image). As a result, the image has improved specular glossiness.

For these reasons, the ink according to the present disclosure is able to form an image having specular glossiness and being less tinted and can suppress clogging of ink jet head nozzles.

In the present disclosure, the plate-like metal particles preferably include at least one metal element having a standard oxidation-reduction potential nobler than −1.65 V. This inhibits the oxidation of the surface of the plate-like metal particles in an image formed, thus suppressing the oxidation-induced reduction in the specular glossiness of an image.

The metal element having a standard oxidation-reduction potential nobler than −1.65 V is preferably gold (Au), silver (Ag), platinum (Pt), copper (Cu), nickel (Ni), or rhodium (Rh).

In terms of the specular glossiness of an image, the metal element having a standard oxidation-reduction potential nobler than −1.65 V is preferably gold, silver, or platinum, more preferably gold or silver.

To form an image that is even less tinted, the metal element having a standard oxidation-reduction potential nobler than −1.65 V is preferably silver or platinum, particularly preferably silver.

The plate-like metal particles preferably include silver in an amount of 80% by mass or more relative to the total amount of plate-like metal particles. This leads to an image having enhanced specular glossiness and being even less tinted.

The plate-like metal particles preferably have an average aspect ratio, which is the ratio of average equivalent circle diameter to average thickness, of 10 or more.

An average aspect ratio of the plate-like metal particles of 10 or more increases the likelihood that the maximum absorption wavelength is located in the wavelength range of 800 nm to 2,500 nm. Thus, the tint of an image is more likely to be reduced.

In addition, an average aspect ratio of the plate-like metal particles of 10 or more reduces light scattering on side surfaces (i.e., surfaces other than the principal surfaces) of the plate-like metal particles, thus also improving the specular glossiness of an image.

The average aspect ratio of the plate-like metal particles is preferably 12 or more, more preferably 13 or more.

Although not particularly limited, the upper limit of the average aspect ratio of the plate-like metal particles is preferably 50, more preferably 40, particularly preferably 30, in terms of the dispersion stability of the plate-like metal particles.

Here, the average aspect ratio of plate-like metal particles refers to the ratio of the average equivalent circle diameter to the average thickness [average equivalent circle diameter/average thickness] of the plate-like metal particles.

Methods for determining the average equivalent circle diameter, the average thickness, and the average aspect ratio will be described later.

The plate-like metal particles preferably have an average equivalent circle diameter of 10 nm to 300 nm.

An average equivalent circle diameter of the plate-like metal particles of 300 nm or less enhances the ink ejectability.

Furthermore, an average equivalent circle diameter of the plate-like metal particles of 300 nm or less also provides high temporal ink stability.

An average equivalent circle diameter of the plate-like metal particles of 10 nm or more makes it easier to produce the plate-like metal particles.

The average equivalent circle diameter of the plate-like metal particles is preferably 50 nm to 300 nm, more preferably 100 nm to 250 nm.

The plate-like metal particle content of the whole ink is preferably 1% to 20% by mass, more preferably 2% to 15% by mass, still more preferably 3% to 10% by mass, particularly preferably 3% to 8% by mass.

A plate-like metal particle content of 1% by mass or more enhances the specular glossiness of an image.

A plate-like metal particle content of 20% by mass or less enhances the ink ejectability.

In the ink according to the present disclosure, the ratio of the absorbance at a wavelength of 500 nm to the absorbance at the maximum absorption wavelength (hereinafter also referred to as the "absorbance ratio [500-nm wavelength/maximum absorption wavelength]" or the "absorbance ratio [500 nm/max]") is preferably 0.3 or less, more preferably 0.2 or less.

An absorbance ratio [500 nm/max] of 0.3 or less leads to an image that is even less tinted.

Preferably, the ink according to the present disclosure further contains water in terms of, for example, handleability of the ink and reduction in the load on the environment.

In the case where the ink according to the present disclosure contains plate-like metal particles including a metal element having a standard oxidation-reduction potential nobler than −1.65 V, if the ink contains water, oxidation of the plate-like metal particles can be inhibited, and thus the oxidation-induced reduction in the specular glossiness of an image can be suppressed.

When the ink according to the present disclosure contains water, the water content of the ink is preferably 10% by mass or more, more preferably 30% by mass or more, still more preferably 40% by mass or more, particularly preferably 50% by mass or more, relative to the total amount of ink.

In terms of ink ejectability, the water content of the ink is preferably 90% by mass or less, more preferably 80% by mass or less, particularly preferably 70% by mass or less, relative to the total amount of ink.

When the ink according to the present disclosure contains water, the ink preferably further contains gelatin.

This enhances the dispersibility of the plate-like metal particles, thus enhancing the ink ejectability.

When the ink according to the present disclosure contains gelatin, the ratio of the mass content of the plate-like metal particles to the mass content of the gelatin (hereinafter also referred to as "the mass ratio [plate-like metal particle/gelatin]") is preferably 1 to 100.

In the ink according to the present disclosure, the organic solvent is preferably at least one selected from the group consisting of propylene glycol, glycerol, and ethylene glycol. This enhances the ink ejectability and the specular glossiness of an image.

The components of the ink according to the present disclosure will now be described.

Plate-Like Metal Particles

The ink according to the present disclosure contains at least one type of plate-like metal particles.

Plate-like metal particles are metal particles having a plate shape.

Here, "plate-like" means having a shape with two principal surfaces.

Preferred ranges of the plate-like metal particle content of the ink are as described above.

Shape of Plate-Like Metal Particles

The plate-like metal particles may be of any shape that is plate-like, i.e., that has two principal surfaces, and any such shape can be appropriately selected according to the purpose.

Examples of the shape of the plate-like metal particles include triangles, quadrangles, hexagons, octagons, and circles. In particular, hexagons and higher polygons and circles (hereinafter also referred to as "hexagonal to circular") are preferred in terms of low absorbance in the visible light range.

Any circle can be appropriately selected according to the purpose as long as the plate-like metal particles are cornerless and round when observed from above their principal surface by transmission electron microscopy (TEM).

Any hexagon can be appropriately selected according to the purpose as long as the plate-like metal particles are hexagonal when observed perpendicularly to their principal surface by transmission electron microscopy (TEM).

The angles of such a hexagon may be acute or obtuse and are preferably obtuse because the absorption in the visible light range can be reduced.

The proportion of hexagonal to circular plate-like metal particles in the plate-like metal particles is preferably 60% by number or more, more preferably 65% by number or more, particularly preferably 70% by number or more, relative to the total number of the plate-like metal particles. If the proportion of hexagonal to circular plate-like metal particles is 60% by number or more, the absorbance in the visible light range is further reduced.

Here, "% by number" refers to a proportion (percentage) of the number of hexagonal to circular plate-like metal particles in 500 plate-like metal particles. % by number is determined by observing 500 plate-like metal particles from above their principal surface by TEM.

Average Equivalent Circle Diameter and Coefficient of Variation

Preferred ranges of the average equivalent circle diameter of the plate-like metal particles are as described above.

In this specification, the average equivalent circle diameter of the plate-like metal particles means the number average of equivalent circle diameters of 500 plate-like metal particles.

The equivalent circle diameter of each plate-like metal particle is determined by using a transmission electron microscope image (TEM image). Specifically, the equivalent circle diameter is defined as the diameter of a circle having the same area as the area (projected area) of a plate-like metal particle in a TEM image.

An exemplary method of measuring the average equivalent circle diameter of the plate-like metal particles is as described in EXAMPLES below.

The coefficient of variation of a particle size distribution of the plate-like metal particles is preferably 35% or less, more preferably 30% or less, particularly preferably 20% or less.

Here, the coefficient of variation of a particle size distribution of the plate-like metal particles means a value (%) obtained by dividing the standard deviation of equivalent circle diameters (particle size distribution) of 500 plate-like metal particles by the number average of the equivalent circle diameters (average equivalent circle diameter) of the 500 plate-like metal particles and multiplying the quotient by 100.

Average Thickness

In terms of the dispersibility of the plate-like metal particles in the ink and ink ejectability, the average thickness of the plate-like metal particles is preferably 30 nm or less, more preferably 5 nm to 20 nm, particularly preferably 5 nm to 16 nm, more particularly preferably 5 nm to 12 nm.

In this specification, the average thickness of the plate-like metal particles means the number average of thicknesses of 500 plate-like metal particles.

The thickness of the plate-like metal particles is measured by focused ion beam-transmission electron microscopy (FIB-TEM).

An exemplary method of measuring the average thickness of the plate-like metal particles is as described in EXAMPLES below.

Average Aspect Ratio

Preferred ranges of the average aspect ratio of the plate-like metal particles are as described above.

As described above, the average aspect ratio of plate-like metal particles means the ratio of the average equivalent circle diameter to the average thickness [average equivalent circle diameter/average thickness] of the plate-like metal particles.

Method for Synthesizing Plate-Like Metal Particles

Any method for synthesizing the plate-like metal particles can be appropriately selected according to the purpose.

For example, triangular to hexagonal plate-like metal particles may be synthesized by a liquid phase method such as chemical reduction, photochemical reduction, or electrochemical reduction.

Of these, chemical reduction and photochemical reduction are preferred for ease of control of shape and size.

When triangular to hexagonal plate-like metal particles are synthesized, treatment such as etching with a silver-dissolving species such as nitric acid or sodium sulfite or aging by heating may be performed after the synthesis to make the angles of the triangular to hexagonal plate-like metal particles obtuser.

Alternatively, the plate-like metal particles may be synthesized by fixing seed crystals in advance to a surface of a transparent substrate such as a film or a glass plate and then growing crystals to form metal particles (e.g., Ag) such that the particles are shaped like plates.

The plate-like metal particles may be subjected to further treatment to be provided with the desired properties.

Any further treatment can be appropriately selected according to the purpose. Examples of such further treatments include the formation of a highly refractive shell layer described in paragraphs [0068] to [0070] of JP2014-184688A and the addition of various additives described in paragraphs [0072] to [0073] of JP2014-184688A.

Gelatin

When the ink according to the present disclosure contains water, the ink according to the present disclosure preferably contains at least one gelatin in terms of the dispersibility of the plate-like metal particles.

In particular, when the ink according to the present disclosure contains water and further includes at least one gelatin, the dispersibility of the plate-like metal particles is significantly improved.

Examples of gelatins include alkali-treated gelatins obtained by methods involving treatment with alkalis, such as lime, during the process of derivation from collagen; acid-treated gelatins obtained by methods involving treatment with acids such as hydrochloric acid; enzyme-treated gelatins obtained by methods involving treatment with enzymes such as hydrolase; oxygen-treated gelatins; modified gelatins (e.g., phthalated gelatin, succinated gelatin, and trimellitated gelatin) obtained by modifying functional groups such as amino, imino, hydroxy, and carboxy groups contained in gelatin molecules with reagents having one group that can react with these functional groups; and gelatins commonly used in the art, such as those described in JP1987-215272A (JP-S62-215272A) from line 6 of the lower left column of page 222 to the bottom line of the upper left column of page 225.

In terms of the dispersibility of the plate-like metal particles in the ink, the weight-average molecular weight of the gelatin is preferably 5,000 to 1,000,000, more preferably 10,000 to 500,000, still more preferably 20,000 to 200,000.

In this specification, weight-average molecular weights are values measured by gel permeation chromatography (GPC).

The GPC is performed using an HLC-8020GPC (manufactured by Tosoh Corporation), three TSKgel (registered trademark) Super Multipore HZ-H columns (manufactured by Tosoh Corporation, 4.6 mm ID×15 cm), and tetrahydrofuran (THF) as an eluent.

The GPC is performed using a differential refractive index (RI) detector under the following conditions: sample concentration, 0.45% by mass; flow rate, 0.35 ml/min; sample injection volume, 10 μl; measurement temperature, 40° C.

Eight Tosoh TSK standard polystyrene samples: "F-40", "F-20", "F-4", "F-1", "A-5000", "A-2500", "A-1000", and "n-propylbenzene" are used to construct a calibration curve.

The ink according to the present disclosure may contain a dispersing agent other than gelatin.

Examples of dispersing agents other than gelatin include resins other than gelatin and polysaccharides.

Examples of resins other than gelatin include polyvinyl acetal resins, polyvinyl alcohol resins, polyvinyl butyral resins, polyacrylate resins, polymethyl methacrylate resins, polycarbonate resins, polyvinyl chloride resins, (saturated) polyester resins, polyurethane resins, and natural polymers other than gelatin (e.g., cellulose).

When the ink according to the present disclosure contains water and a dispersing agent other than gelatin, the dispersing agent other than gelatin is preferably a water-soluble resin.

In this specification, "water-solubility" refers to the property of being soluble in an amount of 5 g or more (more preferably 10 g or more) in 100 g of water at 25° C.

The water-soluble resin for use can be appropriately selected from the resins other than gelatin listed above.

Organic Solvent

The ink according to the present disclosure contains an organic solvent (hereinafter also referred to as a "specific organic solvent") having a boiling point of 150° C. or higher and a solubility parameter (hereinafter also referred to as an "SP value") of 24 $MPa^{1/2}$ or more.

One single or two or more specific organic solvents may be contained in the ink according to the present disclosure.

In the present disclosure, since the specific organic solvent has a boiling point of 150° C. or higher (i.e., the specific organic solvent has a boiling point higher than that of water), the reduction in ejectability that might otherwise be caused by solvent vaporization is suppressed.

In terms of ink ejectability, the boiling point of the specific organic solvent is preferably 170° C. or higher, more preferably 180° C. or higher.

The upper limit of the boiling point of the specific organic solvent is not particularly limited. In terms of ink viscosity, the upper limit of the boiling point of the specific organic solvent is preferably 300° C.

The boiling point can be determined with an ebulliometer (DosaTherm300 manufactured by Titan Technologies).

Boiling points in this specification are boiling points under atmospheric pressure.

In the present disclosure, since the specific organic solvent has an SP value of 24 $MPa^{1/2}$ or more, the alignment properties of the plate-like metal particles are improved in the ink applied to a substrate (i.e., an image), with the result that the specular glossiness of the image is improved.

The SP value of the specific organic solvent is more preferably 25 MPa$^{1/2}$ or more, still more preferably 26 MPa$^{1/2}$ or more, particularly preferably 27 MPa$^{1/2}$ or more.

The upper limit of the SP value of the specific organic solvent is not particularly limited. In terms of ink viscosity, the upper limit of the SP value of the specific organic solvent is preferably 40 MPa$^{1/2}$.

In this specification, solubility parameters (SP values) are values [expressed in MPa$^{1/2}$] determined by the Okitsu method. The Okitsu method is a conventionally known method for calculating SP values and is described in detail, for example, in Journal of the Adhesion Society of Japan, Vol. 29, No. 6 (1993), pp. 249 to 259.

Specific examples of specific organic solvents are shown below. Numerical values in parentheses represent boiling points (expressed in ° C.) and SP values (expressed in MPa$^{1/2}$) in the order described.

Examples of specific organic solvents include ethylene glycol (197° C., 29.9 MPa$^{1/2}$), diethylene glycol (244° C., 24.8 MPa$^{1/2}$), triethylene glycol (125° C. (0.1 mmHg, literature data), 27.8 MPa$^{1/2}$), propylene glycol (188° C., 27.6 MPa$^{1/2}$), 1,4-butanediol (230° C., 30.7 MPa$^{1/2}$), 1,2-pentanediol (206° C., 28.6 MPa$^{1/2}$), 1,5-pentanediol (206° C., 29.0 MPa$^{1/2}$), 1,6-hexanediol (250° C., 27.7 MPa$^{1/2}$), glycerol (290° C., 33.8 MPa$^{1/2}$), formamide (210° C., 39.3 MPa$^{1/2}$), dimethylformamide (153° C., 30.6 MPa$^{1/2}$), methanol (65° C., 28.2 MPa$^{1/2}$), isopropyl alcohol (82° C., 28.7 MPa$^{1/2}$), triethanolamine (208° C. (20 hPa), 32.3 MPa$^{1/2}$), polyethylene glycol (250° C., 26.1 MPa$^{1/2}$), 1,2-hexanediol (223° C., 24.1 MPa$^{1/2}$), dipropylene glycol (230° C., 27.1 MPa$^{1/2}$), and 1,2-butanediol (191° C. (747 mmHg, literature data), 26.1 MPa$^{1/2}$).

Of these, propylene glycol, glycerol, and ethylene glycol are preferred in terms of ink ejectability.

The specific organic solvent content is preferably 5% to 80% by mass, more preferably 5% to 70% by mass, still more preferably 5% to 50% by mass, particularly preferably 10% to 40% by mass, relative to the total amount of ink.

The specific organic solvent content in the above range is advantageous in terms of the dispersibility of the plate-like metal particles, ink viscosity, and ink ejectability.

The ink according to the present disclosure may contain an organic solvent other than the specific organic solvent without sacrifice of ink ejectability.

To enhance the ink ejectability, the amount of organic solvent other than the specific organic solvent is preferably 5% by mass or less, more preferably 3% by mass or less, still more preferably 1% by mass or less, most preferably 0% by mass (i.e., the ink according to the present disclosure does not contain any organic solvent other than the specific organic solvent), relative to the total amount of ink.

Water

As described above, the ink according to the present disclosure preferably contains water.

Preferred ranges of the water content are as described above.

Surfactant

The ink according to the present disclosure may contain at least one surfactant.

The surfactant is preferably a fluorosurfactant.

Any fluorosurfactant can be selected from known fluorosurfactants.

Examples of fluorosurfactants include fluorosurfactants described in "Handbook of Surfactants" (edited by Ichiro Nishi, Ichiro Imai, and Shozo Kasai, published by Sangyo Tosho Co., Ltd., 1960).

Fluorosurfactants containing perfluoro groups in their molecules and having refractive indices of 1.30 to 1.42 (preferably 1.32 to 1.40) are preferred.

A fluorosurfactant having a refractive index of 1.30 to 1.42 enhances the specular glossiness of an image formed.

The refractive index can be measured with a Kalnew Precision Refractometer (KPR-3000 manufactured by Shimadzu Corporation). When the fluorosurfactant is liquid, the refractive index is measured with the fluorosurfactant being placed in a cell. When the fluorosurfactant is solid, the refractive index is measured by a V-block method in which the solid sample is placed in a V-block prism included with the Kalnew Precision Refractometer (KPR-3000 manufactured by Shimadzu Corporation).

The presence of a perfluoro group in the molecule of the fluorosurfactant allows the refractive index of the fluorosurfactant to be easily adjusted to be in the range described above and enables the surface tension of the ink composition to be adjusted with a relatively small amount.

Examples of fluorosurfactants containing perfluoro groups in their molecules and having refractive indices of 1.30 to 1.42 include anionic surfactants such as perfluoroalkyl carboxylates, perfluoroalkyl sulfonates, and perfluoroalkyl phosphates; amphoteric surfactants such as perfluoroalkyl betaines; cationic surfactants such as perfluoroalkyl trimethyl ammonium salts; and nonionic surfactants such as perfluoroalkylamine oxides, perfluoroalkylethylene oxide adducts, oligomers containing perfluoroalkyl groups and hydrophilic groups, oligomers containing perfluoroalkyl groups and lipophilic groups, oligomers containing perfluoroalkyl groups, hydrophilic groups, and lipophilic groups, and urethanes containing perfluoroalkyl groups and lipophilic groups. Fluorosurfactants described in JP1987-170950A (JP-S62-170950A), JP1987-226143A (JP-S62-226143A), and JP1985-168144A (JP-S60-168144A) are also suitable.

Commercially available fluorosurfactants may be used. Examples include Surflon (registered trademark) series (e.g., S-243 and S-242) available from AGC Seimi Chemical Co., Ltd., MEGAFACE (registered trademark) series (e.g., F-444 and F-410) available from DIC Corporation, NOVEC (registered trademark) series (e.g., 27002) available from 3M, and Zonyl series (e.g., FSE) available from E. I. du Pont de Nemours and Company.

The fluorosurfactant content of the ink is preferably 0.01% to 5.0% by mass, more preferably 0.05% to 1.0% by mass, still more preferably 0.1% to 0.5% by mass, relative to the total amount of ink.

A fluorosurfactant content in this range provides better ink composition ejectability and allows the surface tension of the ink composition to be easily adjusted.

Silver Ion Trapping Agent

When the plate-like metal particles of the ink according to the present disclosure include silver, the ink according to the present disclosure preferably further contains a silver ion trapping agent having $pK_{sp}$, as defined by formula (1) below, of 13 or more.

In other words, preferably, the ink according to the present disclosure further contains a silver ion trapping agent having a $pK_{sp}$, as defined by formula (1) below, of 13 or more, and the plate-like metal particles include silver.

$$pK_{sp} = -\log K_{sp} \qquad \text{formula (1)}$$

In formula (1), $K_{sp}$ represents a solubility product of a silver salt at 25° C.

In this preferred embodiment, oxidation of the plate-like metal particles over time and changes in the shape of the plate-like metal particles that might be caused by the oxidation can be more effectively suppressed. As a result, the effect of specular glossiness improvement and the effect of tint reduction are more effectively maintained after the ink has been left to stand for a certain period of time.

The $pK_{sp}$ of the silver ion trapping agent is 13 or more, preferably 14 or more.

The upper limit of the $pK_{sp}$ of the silver ion trapping agent is 20, for example.

The silver ion trapping agent will now be described in more detail.

When the silver ion trapping agent is referred to as a compound HA, $K_a$, $pK_a$, $K_{sp}$, and $pK_{sp}$ of the compound HA (silver ion trapping agent) are defined as follows.

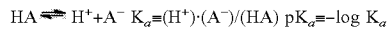

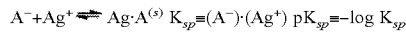

As in the above, the compound HA dissociates into hydrogen atoms H$^+$ and anions A$^-$ in an aqueous solution.

The anions A$^-$ react with silver ions Ag$^+$ to form an insoluble silver salt Ag·A(s).

The solubility product $K_{sp}$ of a silver salt indicates how strong the interaction between anions A$^-$ and silver ions Ag$^+$ is. $K_{sp}$ can be measured by reference to "Yoshikata Sakaguchi and Shinichi Kikuchi, The Bulletin of The Society of Scientific Photography of Japan, 13, 126, (1951)" and "A. Pailliofet and J. Pouradier, Bull. Soc. chim. France, 1982, 1-445 (1982)".

Examples of silver ion trapping agents that can be used include compounds described in paragraphs 0077 to 0093 of JP2009-188360A.

The silver ion trapping agent is preferably an organic compound (hereinafter referred to as a "compound (T)") including at least one of a mercapto group or a nitrogen-containing heterocyclic structure.

The compound (T) is more preferably an organic compound (e.g., compound (T-1), (T-2), or (T-3) described later) including both a mercapto group and a nitrogen-containing heterocyclic structure, particularly preferably an organic compound (e.g., compound (T-2) or (T-3) described later) including at least two mercapto groups and at least one nitrogen-containing heterocyclic structure.

The molecular weight of the compound (T) is preferably 1,000 or less, more preferably 500 or less, particularly preferably 300 or less.

Although the lower limit of the molecular weight of the compound (T) is not particularly limited, the lower limit is 90, for example.

In the compound (T), the nitrogen-containing heterocyclic structure is preferably a nitrogen-containing heterocyclic structure including a 5-membered ring and a 6-membered ring.

The nitrogen-containing heterocyclic structure may be a monocyclic structure or a fused-ring structure. In the case of a fused-ring structure, at least one ring needs to include a nitrogen atom.

Specific examples of nitrogen-containing heterocyclic structures include a tetrazole ring, a triazole ring, an imidazole ring, a thiadiazole ring, an oxadiazole ring, a selenadiazole ring, an oxazole ring, a thiazole ring, a benzoxazole ring, a benzothiazole ring, a benzimidazole ring, a benzindazole ring, a benzotriazole ring, a pyridine ring, a quinoline ring, a pyrimidine ring, a piperidine ring, a piperazine ring, a quinoxaline ring, a morpholine ring, a triazaindene ring, a tetraazaindene ring, and a pentaazaindene ring.

The nitrogen-containing heterocyclic structure may have a mercapto group as a substituent.

The nitrogen-containing heterocyclic structure may have a substituent other than the mercapto group.

Examples of substituents other than the mercapto group include a nitro group, halogen atoms (e.g., chlorine and bromine), a cyano group, substituted and unsubstituted alkyl groups (e.g., methyl, ethyl, propyl, t-butyl, and cyanoethyl groups), substituted and unsubstituted alkoxy groups, substituted and unsubstituted aryl groups (e.g., phenyl, 4-methanesulfonamidephenyl, 4-methylphenyl, 3,4-dichlorphenyl, and naphthyl groups), substituted and unsubstituted alkenyl groups (e.g., an allyl group), substituted and unsubstituted aralkyl groups (e.g., benzyl, 4-methylbenzyl, and phenethyl groups), groups having a sulfonyl group (e.g., methanesulfonyl, ethanesulfonyl, and p-toluenesulfonyl groups), substituted and unsubstituted carbamoyl groups (e.g., unsubstituted carbamoyl, methylcarbamoyl, and phenyl carbamoyl groups), substituted and unsubstituted sulfamoyl groups (e.g., unsubstituted sulfamoyl, methylsulfamoyl, and phenylsulfamoyl groups), carbonamide groups (e.g., acetamide and benzamide groups), sulfonamide groups (e.g., methanesulfonamide, benzenesulfonamide, andp-toluenesulfonamide groups), acyloxy groups (e.g., acetyloxy and benzoyloxy groups), sulfonyloxy groups (e.g., a methanesulfonyloxy group), substituted and unsubstituted ureido groups (e.g., unsubstituted ureido, methylureido, ethylureido, and phenylureido groups), acyl groups (e.g., acetyl and benzoyl groups), oxycarbonyl groups (e.g., methoxycarbonyl and phenoxycarbonyl groups), oxycarbonylamino groups (e.g., methoxycarbonylamino, phenoxycarbonylamino, and 2-ethylhexyloxycarbonylamino groups), a hydroxy group, a carboxy group, and a sulfo group.

One ring may be substituted with two or more substituents.

The substituent other than the mercapto group is preferably an alkyl group having 1 to 6 carbon atoms (preferably 1 to 3 carbon atoms), an alkoxy group having 1 to 6 carbon atoms (preferably 1 to 3 carbon atoms), a hydroxy group, a carboxy group, an alkoxyalkyl group having 1 to 6 carbon atoms (preferably 1 to 3 carbon atoms), or a hydroxyalkyl group having 1 to 6 carbon atoms (preferably 1 to 3 carbon atoms).

Examples of organic compounds (compounds (T)) including at least one of a mercapto group or a nitrogen-containing heterocyclic structure include organic mercapto compounds such as alkylmercapto compounds, arylmercapto compounds, and heterocyclic mercapto compounds.

Examples of alkylmercapto compounds include cysteine and thiomalic acid.

Examples of arylmercapto compounds include thiosalicylic acid.

Examples of heterocyclic mercapto compounds include 2-phenyl-1-mercaptotetrazole, 2-mercaptobenzimidazole, 2-mercaptobenzothiazole, 2-mercaptobenzoxazole, 2-mercaptopyrimidine, 2,4-dimercaptopyrimidine, and 2-mercaptopyridine.

These organic mercapto compounds each may have a substituent such as an alkyl group, a carboxyl group, or a sulfo group.

When the ink according to the present disclosure contains a silver ion trapping agent, the ink according to the present disclosure may contain one single or two or more silver ion trapping agents.

When the ink according to the present disclosure contains a silver ion trapping agent, the silver ion trapping agent content is preferably 0.1% to 70% by mass, more preferably 1% to 50% by mass, still more preferably 2% to 30% by mass, particularly preferably 5% to 20% by mass, relative to the plate-like metal particle content.

Specific non-limiting examples of silver ion trapping agents will be described below.

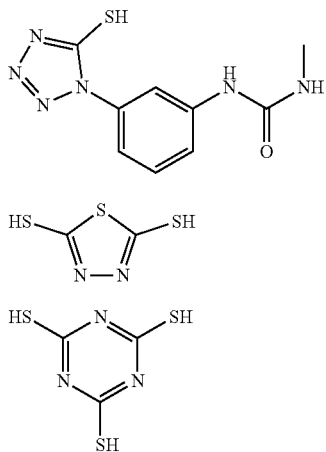

Of these, compound (T-2) (bismuthiol) and compound (T-3) (thiocyanuric acid) are particularly preferred.

Wax

The ink according to the present disclosure may contain wax. This enhances the abrasion resistance of printed matter.

When the ink according to the present disclosure contains wax, the wax content may be preferably, but not necessarily, 0.02% by mass or more and 1.5% by mass or less relative to the total amount of ink.

A wax content of 0.02% by mass or more enhances the abrasion resistance of printed matter.

A wax content of 1.5% by mass or less enhances the specular glossiness of printed matter.

Examples of waxes include resin waxes such as paraffin wax, paraffin-mixed wax, polyethylene wax, polyethylene-mixed wax, oxidized high-density polyethylene wax, polypropylene wax, polypropylene-mixed wax, carnauba wax, and amide wax.

When the ink according to the present disclosure contains wax, the ink may contain one single or two or more waxes.

Of these, paraffin-mixed wax, polyethylene wax, and polyethylene-mixed wax are preferred.

The ink containing wax may be prepared using a commercially available wax dispersion.

Examples of commercially available wax dispersions (emulsion waxes) include AQUACER507 (available from BYK-Chemie), AQUACER515 (available from BYK-Chemie), AQUACER531 (available from BYK-Chemie), AQUACER537 (available from BYK-Chemie), AQUACER539 (available from BYK-Chemie), CERAFLOUR990 (available from BYK-Chemie), and CERAFLOUR995 (available from BYK-Chemie).

Sugar and Sugar Derivative

The ink according to the present disclosure may contain at least one of a sugar or a sugar derivative (hereinafter also referred to as a "saccharide").

This enhances the gas resistance of printed matter.

In terms of improvement in the gas resistance of printed matter and improvement in the ejection stability of ink, the saccharide is preferably, but not necessarily, a tetra or higher saccharide.

When the ink according to the present disclosure contains a saccharide, the ink according to the present disclosure may contain one single or two or more saccharides. More preferably, the ink contains a monosaccharide and a di- or higher saccharide, and particularly preferably, the ink contains a monosaccharide and a tetra- or higher saccharide.

The ink, when containing a monosaccharide and a tetra- or higher saccharide, preferably contains the monosaccharide in an amount of 45% by mass or less and the tetra- or higher saccharide in an amount of 10% by mass or more, particularly preferably contains the monosaccharide in an amount of 7% by mass or less and the tetra- or higher saccharide in an amount of 70% by mass or more.

Examples of sugars include monosaccharides and polysaccharides.

Specific examples of sugars include glucose, ribose, mannitol, mannose, fructose, ribose, xylose, arabinose, galactose, aldonic acid, glucitol (sorbitol), maltose, cellobiose, lactose, sucrose, trehalose, and maltotriose.

Here, polysaccharides mean sugars in a broad sense, and substances widely occurring in nature, such as alginic acid, α-cyclodextrin, and cellulose, are also included in the concept of "polysaccharides".

Examples of sugar derivatives include reduced sugars (e.g., sugar alcohols), oxidized sugars (e.g., aldonic acid and uronic acid), amino acids, and thiosugars.

Examples of sugar alcohols include sugar alcohols represented by the general formula $HOCH_2(CHOH)_nCH_2OH$ (where n represents an integer of 2 to 5).

The ink containing a sugar may be prepared using a commercially available mixed sugar (syrup).

Examples of commercially available mixed sugars (syrups) include hydrogenated starch hydrolysates such as HS-20, HS-30, HS-40, HS-60, HS-300, and HS-500 (names of products from Hayashibara Co., Ltd.), HALLODEX, and MABIT (names of products from Hayashibara Co., Ltd.)

When the ink according to the present disclosure contains a saccharide, the saccharide content is preferably 45% by mass or less relative to the total amount of ink, in terms of the ejection stability of the ink.

When the ink according to the present disclosure contains a saccharide, the saccharide content is preferably 2% by mass or more and 45% by mass or less, more preferably 2% by mass or more and 25% by mass or less, still more preferably 5% by mass or more and 20% by mass or less, particularly preferably 5% by mass or more and 15% by mass or less, relative to the total amount of ink, in terms of the ejection stability of the ink and the abrasion resistance of printed matter.

Other Components

The ink according to the present disclosure may contain other components in addition to the components described above.

Examples of other components include preservatives and anti-foaming agents.

Regarding the preservatives, refer to the description in paragraphs [0073] to [0090] of JP2014-184688A.

Regarding the anti-foaming agents, refer to the description in paragraphs [0091] and [0092] of JP2014-184688A.

Examples of other components also include solid wetting agents (e.g., urea), anti-fading agents, emulsion stabilizers, penetration enhancers, ultraviolet absorbers, antifungal agents, pH adjusters, viscosity modifiers, antirusts, and chelating agents.

Other components also include polymer particles.

Examples of polymer particles include self-dispersing polymer particles described in paragraphs 0090 to 0121 of JP2010-64480A, paragraphs 0130 to 0167 of JP2011-068085A, and paragraphs 0180 to 0234 of JP2011-62998A.

The ink according to the present disclosure may contain, for example, a coloring agent (a pigment, a dye) to the extent that the tint of an image is not affected.

To reduce the tint of an image, the coloring agent content of the ink according to the present disclosure is preferably 1% by mass or less, more preferably 0.1% by mass or less, most preferably 0% by mass (i.e., the ink according to the present disclosure contains no coloring agents), relative to the total amount of ink.

The ink according to the present disclosure may be a photo-curable ink including at least one polymerizable compound. In this case, the ink preferably further includes a polymerization initiator.

Examples of polymerizable compounds include polymerizable compounds (e.g., bi- or more functional (meth)acrylamide compounds) described in paragraphs 0128 to 0144 of JP2011-184628A, paragraphs 0019 to 0034 of JP2011-178896A, and paragraphs 0065 to 0086 of JP2015-25076A.

Examples of polymerization initiators include known polymerization initiators described in paragraphs 0186 to 0190 of JP2011-184628A, paragraphs 0126 to 0130 of JP2011-178896A, and paragraphs 0041 to 0064 of JP2015-25076A.

Preferred Physical Properties of Ink

The physical properties of the ink according to the present disclosure are preferably, but not necessarily, the following physical properties.

The ink according to the present disclosure preferably has a pH at 25° C. (±1° C.) of 7.5 or more.

The pH (at 25° C.±1° C.) of the ink is preferably 7.5 to 13, more preferably 7.5 to 10.

The ink according to the present disclosure preferably has a viscosity in the range of 0.5 mPa·s to 10 mPa·s, more preferably in the range of 1 mPa·s to 7 mPa·s.

The viscosity is measured using a VISCOMETER TV-22 (manufactured by TOKI SANGYO CO., LTD.) under the condition of 30° C.

The ink according to the present disclosure preferably has a surface tension at 25° C. (±1° C.) of 60 mN/m or less, more preferably 20 mN/m to 50 mN/m, still more preferably 25 mN/m to 45 mN/m. A surface tension of the ink of 60 mN/m or less advantageously suppresses curling of substrates. The surface tension is measured using an Automatic Surface Tensiometer CBVP-Z (manufactured by Kyowa Interface Science Co., LTD.) by a plate method.

Applications of Ink Composition

As described above, the ink according to the present disclosure is able to form an image having high specular glossiness and being less tinted (e.g., a neutral metallic image) on a substrate.

To more effectively produce the effect of specular glossiness, the ink according to the present disclosure is preferably used to form an image having a minimum width of 1 mm or more.

The minimum width of an image formed from the ink according to the present disclosure is more preferably 2 mm or more, particularly preferably 3 mm or more.

Although not particularly limited, the upper limit of the minimum width of an image formed from the ink according to the present disclosure is, for example, 300 mm, preferably 200 mm.

The ink according to the present disclosure is used for all types of image formation by ink jet methods without particular limitation. In particular, the ink is preferably used for decorative printing.

Here, decorative printing means all types of printing intended to apply decorations to objects. Decorative printing is different from printing intended for other purposes (e.g., printing for printing electronic circuits).

When the ink according to the present disclosure is used for decorative printing, decorations having high specular glossiness and being less tinted (e.g., neutral metallic decorations) can be applied to objects.

Method for Producing Ink

The ink according to the present disclosure can be produced by any method. Mixing of the components described above can be used as appropriate.

Preferably, the ink according to the present disclosure is produced by a method (hereinafter referred to as "Production method A") having a step of providing a dispersion containing plate-like metal particles and a step of mixing together at least the dispersion and the specific organic solvent described above.

When the ink according to the present disclosure further contains water, the dispersion in Production method A preferably further contains water.

In Production method A, preferred embodiments of the plate-like metal particles and the specific organic solvent are as described above.

As with the ink according to the present disclosure, the dispersion preferably has a maximum absorption wavelength in the wavelength range of 800 nm to 2,500 nm.

Preferred spectral characteristics of the dispersion are the same as preferred spectral characteristics of the ink according to the present disclosure.

In the mixing step in Production method A, the dispersion and the specific organic solvent may be mixed with a surfactant.

In the mixing step in Production method A, the dispersion and the specific organic solvent (and optionally a surfactant) may be mixed with other components.

Surfactants and other components that may be mixed in the mixing step are respectively the same as the above-described surfactants and other components that may be contained in the ink.

Image Forming Method

Image formation using the ink according to the present disclosure is preferably, but not necessarily, performed by the following image forming method according to the present embodiment.

The image forming method according to the present embodiment has an ink application step of applying the ink according to the present disclosure described above to a substrate by an ink jet method.

The substrate may be, for example, any paper substrate or any resin substrate.

Examples of paper substrates include plain paper, glossy paper, and coated paper.

Glossy paper is a paper substrate including base paper and polymer particles or porous particles disposed on the base paper.

Examples of commercially available products of glossy paper include, but are not limited to, "Kassai (registered trademark)" available from Fujifilm, photo paper and glossy photo paper available from Seiko Epson Corporation, and glossy paper available from Konica Minolta, Inc.

Coated paper is a paper substrate including a base paper and a coating layer disposed on the base paper.

Examples of commercially available products of coated paper include, but are not limited to, "OK Topcoat (registered trademark) Plus" available from Oji Paper Co., Ltd. and "Aurora Coat" available from Nippon Paper Industries Co., Ltd.

To provide an image with higher specular glossiness, the paper substrate is preferably glossy paper or coated paper, more preferably glossy paper.

Examples of resin substrates include resin films.

Examples of resins for resin substrates (e.g., resin films) include polyvinyl chloride, cellulose diacetate, cellulose triacetate, cellulose propionate, cellulose butyrate, cellulose acetate butyrate, cellulose nitrate, polyethylene terephthalate, polyethylene naphthalate, polyethylene, polystyrene, polypropylene, polycarbonate, polyvinyl acetal, and acrylic resins.

Of these, polyvinyl chloride (PVC) and polyethylene terephthalate (PET) are preferred to provide an image with higher specular glossiness.

The substrate according to the present embodiment may be a substrate already having an image formed thereon.

In other words, the image forming method according to the present embodiment may be a method of forming, by using the ink according to the present disclosure, an image on a color image (the color may be a chromatic color or an achromatic color) that has already been formed on a substrate.

For the ink jet method, any known system can be appropriately employed: for example, a charge control system, which utilizes electrostatic attraction force to eject ink; a drop-on-demand system (pressure pulse system), which utilizes the oscillating pressure of a piezoelectric element; an acoustic ink jet system, which converts an electric signal into an acoustic beam and applying the acoustic beam to ink, thereby putting radiation pressure on the ink to eject the ink; or a thermal ink jet (Bubble Jet (registered trademark)) system, which heats ink to form bubbles and utilizes the pressure generated.

An ink jet head used in the ink jet method may be of the on-demand type or the continuous type.

The system of ink ejection from the ink jet head may be any system. Specific examples of ejection systems include electromechanical conversion systems (e.g., single cavity type, double cavity type, bender type, piston type, shear mode type, and shared wall type); electrothermal conversion systems (e.g., thermal ink jet type and Bubble Jet (registered trademark) type); electrostatic suction systems (e.g., electric field control type and slit jet type); and electrical ejection systems (e.g., spark jet type).

In ejecting ink by the ink jet method, any ink nozzle can be appropriately selected according to the purpose.

Examples of recording systems in the ink jet method include a shuttle system in which a short serial head is used and recording is performed while scanning a target substrate across its width with the head; and a line system (single pass system) which uses a line head in which recording elements are arranged so as to extend across one side of a target substrate.

The image forming method according to the present embodiment may include a step of drying the ink applied to the substrate.

The drying may be air drying at room temperature or heat drying.

When the substrate is a resin substrate, heat drying is preferred.

The heat drying may be performed by any means such as a heating drum, warm air, an infrared lamp, a hot oven, or hot-plate heating.

The temperature of the heat drying is preferably 50° C. or higher, more preferably about 60° C. to 150° C., still more preferably about 70° C. to 100° C.

The time of the heat drying, which can be appropriately set taking into account the composition and ejection rate of the ink, is preferably 1 minute to 180 minutes, more preferably 5 minutes to 120 minutes, particularly preferably 5 minutes to 60 minutes.

EXAMPLES

The present invention will now be described in more detail with reference to examples. It should be noted that other examples may be used without departing from the spirit of the present invention.

Preparation of Metal Particle Dispersion A

A metal particle dispersion A was prepared as a dispersion of metal particles. A detailed description will be given below.

Preparation of Metal-Particle-Forming Liquid

A reaction vessel made of high Cr—Ni—Mo stainless steel (NTKR-4 available from Nippon Metal Industry Co., Ltd.) was provided. This reaction vessel included an agitator including a stainless steel (SUS316L) shaft equipped with four propellers made of NTKR-4 and four paddles made of NTKR-4.

In the reaction vessel, 13 L (liters) of ion-exchanged water was stirred with the agitator while adding 1.0 L of 10 g/L aqueous trisodium citrate (anhydride) solution thereto. The resulting solution was kept warm at 35° C.

To the solution kept warm at 35° C., 0.68 L of 8.0 g/L aqueous polystyrene sulfonic acid solution was added, and, furthermore, 0.041 L of aqueous sodium borohydride solution whose sodium borohydride concentration was adjusted to 23 g/L was added. Here, the concentration of the aqueous sodium borohydride solution was adjusted using a 0.04 N (mol/L; hereinafter the same) aqueous sodium hydroxide (NaOH) solution.

To the solution to which the aqueous sodium borohydride solution was added, 13 L of 0.10 g/L aqueous silver nitrate solution was further added at a rate of 5.0 L/min.

To the resulting solution, 1.5 L of 10 g/L aqueous trisodium citrate (anhydride) solution and 11 L of ion-exchanged water were further added, and 0.68 L of 80 g/L aqueous potassium hydroquinone sulfonate solution was further added.

Next, the stirring speed was increased to 800 rpm (round per minute; hereinafter the same), and then 8.1 L of 0.10 g/L aqueous silver nitrate solution was added at 0.95 L/min, after which the temperature of the resulting solution was decreased to 30° C.

To the solution cooled to 30° C., 8.0 L of 44 g/L aqueous methylhydroquinone solution was added, and then the whole amount of aqueous gelatin solution at 40° C., which will be described later, was added.

The stirring speed was then increased to 1,200 rpm, and the whole amount of silver sulfite white precipitate mixed solution, which will be described later, was added. The pH of the solution to which the silver sulfite white precipitate mixed solution was added was gradually changed.

After the pH of the solution stopped changing, 5.0 L of 1 N (mol/L) aqueous sodium hydroxide (NaOH) solution was added to the solution at 0.33 L/min. The pH of the resulting solution was adjusted to 7.0±1.0 using NaOH and citric acid (anhydride). Next, to the solution after pH adjustment, 0.18 L of 2.0 g/L aqueous 1-(m-sulfophenyl)-5-mercaptotetrazole sodium solution was added, and then 0.078 L of 70 g/L aqueous 1,2-benzisothiazolin-3-one solution adjusted to be alkaline was added.

In this manner, a metal-particle-forming liquid was obtained.

Preparation of Aqueous Gelatin Solution

A SUS316L stainless steel dissolving tank including a SUS316L stainless steel agitator was provided.

In the dissolving tank was placed 16.7 L of ion-exchanged water, and while stirring with the agitator at a low speed, 1.4 kg of alkali-treated bovine bone gelatin (GPC weight-average molecular weight: 200,000) subjected to deionization treatment was added thereto.

To the resulting solution, 0.91 kg of alkali-treated bovine bone gelatin (GPC weight-average molecular weight: 21,000) subjected to deionization treatment, protease treatment, and oxidation treatment with hydrogen peroxide was further added.

Thereafter, the temperature of the solution was increased to 40° C. to swell and at the same time dissolve the gelatin, thereby completely dissolving the gelatin.

In this manner, an aqueous gelatin solution was obtained.

Preparation of Silver Sulfite White Precipitate Mixed Solution

A SUS316L stainless steel dissolving tank including a SUS316L stainless steel agitator was provided.

In the dissolving tank was placed 8.2 L of ion-exchanged water, and 8.2 L of 100 g/L aqueous silver nitrate solution was added thereto.

While stirring the resulting solution with the agitator at a high speed, 2.7 L of 140 g/L aqueous sodium sulfite solution was added thereto in a short time, whereby a mixed solution including a white precipitate of silver sulfite (i.e., a silver sulfite white precipitate mixed solution) was obtained.

This silver sulfite white precipitate mixed solution was prepared immediately before use.

Spectral Characteristics of Metal-Particle-Forming Liquid

The metal-particle-forming liquid described above was diluted with ion-exchanged water and measured for its spectral characteristics using a spectrophotometer (U-3500 manufactured by Hitachi, Ltd.) The maximum absorption wavelength in the wavelength range of 300 nm to 2,500 nm was 850 nm, and the full width at half maximum of the absorption peak at the maximum absorption wavelength was 270 nm.

The absorbance at a wavelength of 500 nm was divided by the absorbance at the maximum absorption wavelength to determine that the absorbance ratio [500 nm/max] was 0.12.

Physical Properties of Metal-Particle-Forming Liquid

The physical properties of the metal-particle-forming liquid were as follows: pH at 25° C., 9.4 (measured with a KRSE manufactured by AS ONE Corporation); electric conductivity, 8.1 mS/cm (measured with a CM-25R manufactured by DKK-TOA Corporation); viscosity, 2.1 mPa·s (measured with an SV-10 manufactured by A & D Company, Limited).

The metal-particle-forming liquid was put in a 20 L container of Union Container II Type (low-density polyethylene container available from AS ONE Corporation) and stored at 30° C.

Preparation of Metal Particle Dispersion A (Deionization Treatment and Redispersion Treatment)

The metal-particle-forming liquid was subjected to deionization treatment and redispersion treatment to obtain a metal particle dispersion A. The detailed procedure is as follows.

Eight hundred grams of the metal-particle-forming liquid described above was weighed into a centrifuge tube, and the pH was adjusted to 9.2±0.2 at 25° C. using 1 N sulfuric acid.

After the metal-particle-forming liquid after pH adjustment was centrifuged using a centrifuge (himac CR22GIII manufactured by Hitachi Koki Co., Ltd.; angle rotor, R9A) at 35° C. and 9,000 rpm for 60 minutes, 784 g of the supernatant was removed. To the solid left behind (the solid including metal particles and gelatin), 0.2 mmol/L of aqueous NaOH solution was added to a total of 400 g. The resulting solution was stirred by hand with a stirring rod to obtain a crude dispersion X.

By the above procedure, 24 batches of the crude dispersion X were prepared, and the whole crude dispersion X (i.e., 9,600 g in total) was placed in a SUS316L stainless steel tank and mixed. Thereafter, 10 mL of 10 g/L solution (solvent: a mixed solution of methanol and ion-exchanged water in a ratio of 1:1 (by volume)) of Pluronic31R1 (a nonionic surfactant available from BASF) was further added thereto.

Next, using a Model 20 AUTO MIXER (stirring unit: HOMOGENIZING MIXER MARK II) manufactured by PRIMIX Corporation, the mixture of the crude dispersion X in the tank was subjected to a batchwise dispersion treatment at 9,000 rpm for 120 minutes. The temperature of the dispersion during the dispersion treatment was maintained at 50° C.

After the dispersion treatment, the temperature was decreased to 25° C., and then single-pass filtration was performed using a Profile II filter (product type: MCY1001Y030H13, available from Pall Corporation).

Eight hundred grams of the liquid (filtrate) obtained by the filtration was weighed into a centrifuge tube. After the filtrate was centrifuged using the above-described centrifuge at 35° C. and 9,000 rpm for 60 minutes, 784 g of the supernatant was removed. To the solid left behind (the solid including metal particles and gelatin), 0.2 mmol/L of aqueous NaOH solution was added to a total of 40 g. The resulting solution was stirred by hand with a stirring rod to obtain a crude dispersion Y.

By the above procedure, 120 batches of the crude dispersion Y were prepared, and the whole crude dispersion Y (i.e., 4,800 g in total) was placed in a SUS316L stainless steel tank and mixed. Thereafter, 5 mL of 10 g/L solution (solvent: a mixed solution of methanol and ion-exchanged water in a ratio of 1:1 (by volume)) of Pluronic31R1 (a nonionic surfactant available from BASF) was further added thereto.

Next, using a Model 20 AUTO MIXER (stirring unit: HOMOGENIZING MIXER MARK II) manufactured by PRIMIX Corporation, the mixture of the crude dispersion Y in the tank was subjected to a batchwise dispersion treatment at 9,000 rpm for 120 minutes. The temperature of the dispersion during the dispersion treatment was maintained at 50° C.

By the above procedure, the metal-particle-forming liquid was subjected to deionization treatment and redispersion treatment to thereby obtain the metal particle dispersion A.

Spectral Characteristics of Metal Particle Dispersion A

The spectral characteristics of the metal particle dispersion A were measured by the same method as that used for the metal-particle-forming liquid.

The results are shown in Table 1.

Physical Properties of Metal Particle Dispersion A and Metal Particle Content

The physical properties of the metal particle dispersion A was as follows: pH at 25° C., 7.0; electric conductivity, 0.08 mS/cm; viscosity, 7.4 mPa·s.

The metal particle content (in Example 1, the plate-like silver particle content) of the metal particle dispersion A was 10% by mass, and the gelatin content was 1% by mass.

The metal particle dispersion A was put in a 20 L container of Union Container II Type and stored at 30° C.

Shape of Metal Particles

The metal particle dispersion A was observed under a transmission electron microscope (TEM) to determine that the shape of the metal particles contained in the dispersion A was plate-like as shown in Table 1.

Average Equivalent Circle Diameter of Metal Particles

The TEM image obtained by observing the metal particle dispersion A under a transmission electron microscope (TEM) was imported into image processing software ImageJ (provided by National Institutes of Health (NIH)) and subjected to image processing.

More particularly, 500 metal particles randomly selected from TEM images of several fields of view were subjected to image analysis, and the diameter of an equivalent circle of equal area was calculated. The calculated values of the diameter of an equivalent circle of equal area of the 500 metal particles were simply averaged (number averaged) to determine the average equivalent circle diameter of the metal particles.

The results are shown in Table 1.

Average Thickness of Metal Particles

The metal particle dispersion A was dropped onto a silicon substrate and dried to prepare an observation sample. Using the observation sample, the thickness of 500 metal particles contained in the metal particle dispersion A was measured by focused ion beam-transmission electron microscopy (FIB-TEM).

The measured values of the thickness of the 500 metal particles were simply averaged (number averaged) to determine the average thickness of the metal particles.

The results are shown in Table 1.

Average Aspect Ratio of Metal Particles

The average equivalent circle diameter of the metal particles was divided by the average thickness of the metal particles to determine the average aspect ratio of the metal particles.

The results are shown in Table 1.

Preparation of Metal Particle Dispersions B to F

Metal particle dispersions B to F were each prepared in the same manner as the preparation of the metal particle dispersion A except that the amount of "13 L of 0.10 g/L aqueous silver nitrate solution" added and the timing of the addition of "5.0 L of 1 N (mol/L) aqueous sodium hydroxide (NaOH) solution" were changed in "Preparation of Metal-Particle-Forming Liquid" described above.

On each of the metal particle dispersions B to F, the same measurements and determinations as performed on the metal particle dispersion A were performed.

The results are shown in Table 1.

Specifically, in the preparation of the metal particle dispersions B to F, the amount of "13 L of 0.10 g/L aqueous silver nitrate solution" added was decreased to increase the average equivalent circle diameter of metal particles formed, thus increasing the average aspect ratio.

The timing of the addition of "5.0 L of 1 N (mol/L) aqueous sodium hydroxide (NaOH) solution" was advanced (e.g., "5.0 L of 1 N (mol/L) aqueous sodium hydroxide (NaOH) solution" was added before the pH of the solution to which the silver sulfite white precipitate mixed solution was added stopped changing) to decrease the average aspect ratio.

Preparation of Metal Particle Dispersion G

A gold nanoparticle dispersion was prepared as a metal particle dispersion G.

Specifically, a gold-nanoparticle-forming liquid is first prepared by the method described in Pelaz et al. "Tailoring the synthesis and heating ability of gold nanoprisms for bioapplications", Langmuir 2012, 28, 8965-70, and then deionization treatment and redispersion treatment were performed on the gold-nanoparticle-forming liquid in the same manner as the deionization treatment and redispersion treatment performed in the preparation of the metal particle dispersion A, thereby obtaining the metal particle dispersion G.

On the metal particle dispersion G, the same measurements and determinations as performed on the metal particle dispersion A were performed.

The results are shown in Table 1.

Provision of Metal Particle Dispersion H

An "SB11015" aluminum particle dispersion available from ECKART was provided as a metal particle dispersion H.

On the metal particle dispersion H, the same measurements and determinations as performed on the metal particle dispersion A were performed.

The results are shown in Table 1.

Provision of Metal Particle Dispersion I

An "SB11020" aluminum particle dispersion available from ECKART was provided as a metal particle dispersion I.

On the metal particle dispersion I, the same measurements and determinations as performed on the metal particle dispersion A were performed.

The results are shown in Table 1.

TABLE 1

| | Metal particles | | | | | Gelatin | | |
| --- | --- | --- | --- | --- | --- | --- | --- | --- |
| Dispersion | Metal | Shape | Average equivalent circle diameter (nm) | Average thickness (nm) | Average aspect ratio | Amount relative to the total amount of dispersion [mass %] | Amount relative to the total amount of dispersion [mass %] | Maximum absorption wavelength (nm) | Absorbance ratio [500 nm/max] |
| A | Ag | plate-like | 120 | 9 | 13.3 | 10 | 1 | 850 | 0.12 |
| B | Ag | plate-like | 170 | 9 | 18.9 | 10 | 1 | 1000 | 0.1 |
| C | Ag | plate-like | 220 | 9 | 24.4 | 10 | 1 | 1300 | 0.08 |
| D | Ag | plate-like | 220 | 12 | 18.3 | 10 | 1 | 1000 | 0.25 |
| E (for comparison) | Ag | plate-like | 60 | 8 | 7.5 | 10 | 1 | 700 | 0.15 |
| F (for comparison) | Ag | plate-like | 120 | 20 | 6.0 | 10 | 1 | 600 | 0.35 |
| G | Au | plate-like | 170 | 9 | 18.9 | 10 | 1 | 1000 | 0.21 |

TABLE 1-continued

|  |  | Metal particles |  |  |  |  | Gelatin |  |  |
| --- | --- | --- | --- | --- | --- | --- | --- | --- | --- |
| Dispersion | Metal | Shape | Average equivalent circle diameter (nm) | Average thickness (nm) | Average aspect ratio | Amount relative to the total amount of dispersion [mass %] | Amount relative to the total amount of dispersion [mass %] | Maximum absorption wavelength (nm) | Absorbance ratio [500 nm/max] |
| H (for comparison) | Al | plate-like | 600 | ND | ND | 6 | 0 | none | 1 |
| I (for comparison) | Al | plate-like | 600 | ND | ND | 6 | 0 | none | 1 |

Legend of Table 1

"None" in the "Maximum absorption wavelength" column indicates that no apparent peaks were observed in the wavelength range of 300 nm to 2,500 nm and a maximum absorption wavelength could not be definitely determined.

Absorbance ratio [500 nm/max] is the ratio of the absorbance at a wavelength of 500 nm to the absorbance at the maximum absorption wavelength. When "none" is given in the "Maximum absorption wavelength" column, the absorbance ratio [500 nm/max] is "1".

"ND" means No Data.

Example 1

Preparation of Ink

The metal particle dispersion A, organic solvent (propylene glycol), Surflon (registered trademark) S-243 (fluorosurfactant available from AGC Seimi Chemical Co., Ltd.), and ion-exchanged water were used to prepare an ink having the following composition.

| Composition of Ink | |
| --- | --- |
| metal particles (in Example 1, plate-like silver particles) | 5% by mass |
| gelatin (a mixture of alkali-treated bovine bone gelatin having a weight-average molecular weight of 200,000 and alkali-treated bovine bone gelatin having a weight-average molecular weight of 21,000) | 0.5% by mass |
| propylene glycol (PG; an organic solvent having a boiling point of 188° C. and an SP value of 27.6(MPa)$^{1/2}$) | 30% by mass |
| Surflon (registered trademark) S-243 (a fluorosurfactant 1 having a perfluoro group, refractive index = 1.35, available from AGC Seimi Chemical Co., Ltd.) | 0.14% by mass |
| ion-exchanged water | the balance that makes the total amount 100% by mass |

Spectral Characteristics of Ink

The spectral characteristics (maximum absorption wavelength and absorbance ratio [500 nm/max]) of the ink were measured by the same method as that used to measure the spectral characteristics of the metal particle dispersion A.

The results are shown in Table 2.

Shape and Size of Metal Particles Contained in Ink

The shape and size (specifically, shape, average equivalent circle diameter, average thickness, and average aspect ratio) of the metal particles contained in the ink were determined in the same manner as the shape and size of the metal particles contained in the metal particle dispersion A.

The results are shown in Table 2.

Image Formation and Evaluations (Substrate: Glossy Paper)

A dedicated cartridge (Dimatix Materials Cartridge (Jet-powerd)) of an ink jet printer (DMP-2831 manufactured by FUJIFILM DIMATIX) was filled with the ink. The dedicated cartridge had a structure in which an ink cartridge and an ink jet head are integrated together. The ink jet head of the dedicated cartridge had 16 nozzles having a nozzle diameter of 21.5 μm.

The dedicated cartridge filled with the ink was then put in the ink jet printer.

Using the ink jet printer, the ink was then ejected through the nozzles of the dedicated cartridge to form a solid image (70 mm long×30 mm wide) on a glossy paper substrate ("Kassai" (registered trademark) available from Fujifilm) at room temperature. The solid image was formed under the following conditions: dot density, 1,200 dpi (dot per inch); the amount of dropping, 23 g/m$^2$.

In the image formation, and on the solid image formed, the following evaluations were performed.

The results are shown in Table 2.

Ink Ejectability

During the image formation, the ink jet head nozzles were visually observed to determine the number of nozzles that allowed successful ejection.

On the basis of the observation, the ink ejectability was evaluated according to the following evaluation criteria. In the evaluation criteria, AA and A are suitable for practical use. In Table 2, the ink ejectability is simply expressed as "ejectability".

Evaluation Criteria for Ink Ejectability

AA: Among a total of 16 nozzles, the number of nozzles that allowed successful ejection was 14 to 16.

A: Among a total of 16 nozzles, the number of nozzles that allowed successful ejection was 10 to 13.

B: Among a total of 16 nozzles, the number of nozzles that allowed successful ejection was 7 to 9.

C: Among a total of 16 nozzles, the number of nozzles that allowed successful ejection was 1 to 6.

D: Among a total of 16 nozzles, the number of nozzles that allowed successful ejection was 0.

Tint of Image

The solid image was measured for its a* and b* by using a SpectroEye spectrophotometer (manufactured by Sakata Inx Eng. Co., Ltd.) Using the results, the metric saturation was calculated by the formula (a*$^2$ b*$^2$)$^{1/2}$. On the basis of the metric saturation values obtained, the tint of the image was evaluated according to the following evaluation criteria.

Smaller metric saturation values indicate that the image is less tinted (i.e., the image is neutral). Specifically, in the following evaluation criteria, "S" indicates that the image is least tinted.

Evaluation Criteria of Tint of Image
- S: The metric saturation value is less than 1.
- AA: The metric saturation value is 1 or more and less than 3.
- A: The metric saturation value is 3 or more and less than 5.
- B: The metric saturation value is 5 or more and less than 10.
- C: The metric saturation value is 10 or more.

Specular Glossiness of Image (Gloss Value)

The solid image was measured for its 20° gloss value and 60° gloss value by using a glossmeter (micro-TRI-gloss manufactured by BYK). On the basis of the measurements, the specular glossiness of the image was evaluated according to the following evaluation criteria.

For both the 20° gloss value and the 60° gloss value, higher values indicate higher specular glossiness. Specifically, in the following evaluation criteria, the highest result of the specular glossiness of an image is "S".

Evaluation Criteria for Specular Glossiness of Image (20° Gloss Value)
- S: The 20° gloss value is 1000 or more.
- AA: The 20° gloss value is 800 or more and less than 1000.
- A: The 20° gloss value is 600 or more and less than 800.
- B: The 20° gloss value is 300 or more and less than 600.
- C: The 20° gloss value is less than 300.

Evaluation Criteria for Specular Glossiness of Image (60° Gloss Value)
- S: The 60° gloss value is 1000 or more.
- AA: The 60° gloss value is 800 or more and less than 1000.
- A: The 60° gloss value is 500 or more and less than 800.
- B: The 60° gloss value is 300 or more and less than 500.
- C: The 60° gloss value is less than 300.

Specular Glossiness of Image (Sensory Evaluation)

By visually observing the solid image, the specular glossiness of the image was evaluated according to the following evaluation criteria.

The highest result of the specular glossiness of an image is "S".

Evaluation Criteria for Specular Glossiness of Image (Sensory Evaluation)
- S: The image has very high specular glossiness, and a reflected object can be clearly seen like an image in a mirror.
- AA: The image has high specular glossiness, and a reflected object is distinguishable.
- A: The image has specular glossiness, but a reflected object is indistinguishable.
- B: Although showing a slight metallic luster, the image has no specular glossiness and reflects no objects.
- C: The image is lusterless and looks gray.

Evaluation of Temporal Ink Stability

After the image formation described above, the ink cartridge was left to stand at room temperature for 5 hours. After leaving the ink cartridge to stand, image formation (hereinafter also referred to as "image formation after leaving to stand") was performed in the same manner as the image formation described above.

During the image formation after leaving to stand, the ink jet head nozzles were visually observed to determine the number of nozzles that allowed successful ejection.

On the basis of the observation, the temporal ink stability was evaluated according to the following evaluation criteria. In the evaluation criteria, A and B are suitable for practical use. In Table 2, the temporal ink stability is simply expressed as "temporal stability".

Evaluation Criteria for Temporal Ink Stability
- A: Among a total of 16 nozzles, the number of nozzles that allowed successful ejection was 10 or more.
- B: Among a total of 16 nozzles, the number of nozzles that allowed successful ejection was 5 to 9.
- C: Among a total of 16 nozzles, the number of nozzles that allowed successful ejection was 1 to 4.
- D: Among a total of 16 nozzles, the number of nozzles that allowed successful ejection was 0.

Examples 2 to 10 and Comparative Examples 1 to 8

The same procedure as in Example 1 was conducted except that the combination of the type of metal particle dispersion, the amount of metal particles relative to the total amount of ink, and the type of organic solvent was changed as shown in Table 2 below.

The results are shown in Table 2.

In all the examples, the organic solvent content relative to the total amount of ink was 30% by mass. The amount of metal particles relative to the total amount of ink was changed by changing the amount of metal particle dispersion used.

Comparative Example 9

The same procedure as in Example 1 was conducted except that the ink was changed to an ink for comparison (Comparative Example 9) prepared in accordance with Example 7 of JP2008-523246A.

The results are shown in Table 2.

Preparation of Ink for Comparison (Comparative Example 9)

Regular bone gelatin in an amount of 240 g, 1.5 mL of PLURONIC (trademark) 31R1 (oxirane, methyl-, polymer), and ion-exchanged water were mixed together to prepare 6.9 L of solution. To the solution, 3M $AgNO_3$ and NaCl were added at a solution temperature of 75° C., and double-jet precipitation was performed to prepare a dispersion of 100% AgCl cubic particles (hereinafter also referred to as a "silver chloride dispersion"). Here, the flow rate of the $AgNO_3$ solution was 32 mL/min for initial 2.5 minutes, and the flow rate was then increased to 200 mL/min over 25 minutes. Thereafter, the flow rate was held at 200 ml/min until 4 L of the $AgNO_3$ solution was consumed.

Unwanted reaction by-products were removed by washing the silver chloride dispersion by membrane ultrafiltration (UF) to a solution conductivity of less than 10 mS, a pAg of 6.8, and a pH of 5.6. After the washing, additional gelatin was added in an amount of 20 g per molar equivalent of silver.

Next, a developer composition (1 liter) was prepared as described below.

Sodium erythorbate (developer) in an amount of 50.0 g, 3.0 g of HMMP (4'-hydroxymethyl-4-methyl-1-phenyl-3-pyrazolidone; developer), 8.0 g of sodium thiosulfate (fixative), 20 g of $K_2CO_3$ (buffer), and 900 mL of ion-exchanged water were mixed together, and the pH of the resulting solution was adjusted to 11.5 with BAS-2013. Subsequently, ion-exchanged water was added to a total of 1,000 mL to obtain a developer composition.

A portion (including 2 mol of silver chloride) of the above-described silver chloride dispersion to which 20 g of additional gelatin was added was treated with sodium hydroxide at a dispersion temperature of 40° C., thereby adjusting the pH of the portion to 12. This fogged the silver chloride particles.

The dispersion including the fogged silver chloride particles and 15 L of the developer composition were directly added (rapidly, red light was emitted over approximately two seconds) to a reaction kettle held at 40° C. and then stirred at a high speed using a prop-stirrer. The contents of the reaction kettle went gray within two to three seconds. Subsequently, the pH of the contents of the reaction kettle was maintained over 10 for initial 3 minutes, and the pH was adjusted to 11 for the next 10 minutes, whereby the fogged silver chloride particles were developed to obtain silver particles. The pH adjustment was performed by adding an aqueous sodium hydroxide solution. Subsequently, the solution including the silver particles was washed by UF using an ultrafiltration device and then concentrated to a solution conductivity of less than 20 mS to obtain a silver particle dispersion.

To the silver particle dispersion, a surfactant (ethanesulfonic acid, 2-(2-(2-(4-(1,1,3,3-tetramethylbutyl)phenoxy)ethoxy)ethoxy)-, sodium salt) in an amount of 2% by mass relative to the total amount of silver particle dispersion was added, and the resultant was then treated to a solids content of 71.8 g/kg, thereby obtaining an ink for comparison (Comparative Example 9).

TABLE 2

| | Ink | | | | | | | | | | |
|---|---|---|---|---|---|---|---|---|---|---|---|
| | Metal particles | | | | | | Organic solvent | | | Maximum | Absorbance |
| | Dispersion | Metal | Shape | Average equivalent circle diameter (nm) | Average thickness (nm) | Average aspect ratio | Amount relative to the total amount of ink [mass %] | Type | SP value (MPa$^{1/2}$) | Boiling point (° C.) | absorption wavelength (nm) | ratio [500 nm/max] |
| Example 1 | A | Ag | plate-like | 120 | 9 | 13.3 | 5 | PG | 27.6 | 188 | 850 | 0.12 |
| Example 2 | B | Ag | plate-like | 170 | 9 | 18.9 | 5 | PG | 27.6 | 188 | 1000 | 0.1 |
| Example 3 | C | Ag | plate-like | 220 | 9 | 24.4 | 5 | PG | 27.6 | 188 | 1300 | 0.08 |
| Example 4 | D | Ag | plate-like | 220 | 12 | 18.3 | 5 | PG | 27.6 | 188 | 1000 | 0.25 |
| Comparative Example 1 | E | Ag | plate-like | 60 | 8 | 7.5 | 5 | PG | 27.6 | 188 | 700 | 0.15 |
| Example 5 | B | Ag | plate-like | 170 | 9 | 18.9 | 2.5 | PG | 27.6 | 188 | 1000 | 0.1 |
| Example 6 | B | Ag | plate-like | 170 | 9 | 18.9 | 3.5 | PG | 27.6 | 188 | 1000 | 0.1 |
| Example 7 | B | Ag | plate-like | 170 | 9 | 18.9 | 6.5 | PG | 27.6 | 188 | 1000 | 0.1 |
| Example 8 | B | Ag | plate-like | 170 | 9 | 18.9 | 5 | GL | 33.8 | 290 | 1000 | 0.1 |
| Example 9 | B | Ag | plate-like | 170 | 9 | 18.9 | 5 | EG | 29.9 | 197 | 1000 | 0.1 |
| Comparative Example 2 | B | Ag | plate-like | 170 | 9 | 18.9 | 5 | DEGmEE | 20.9 | 198 | 1000 | 0.1 |
| Comparative Example 3 | B | Ag | plate-like | 170 | 9 | 18.9 | 5 | EGmBE | 19.4 | 171 | 1000 | 0.1 |
| Comparative Example 4 | B | Ag | plate-like | 170 | 9 | 18.9 | 5 | MeOH | 28.2 | 65 | 1000 | 0.1 |
| Comparative Example 5 | B | Ag | plate-like | 170 | 9 | 18.9 | 5 | i-PrOH | 28.7 | 83 | 1000 | 0.1 |
| Comparative Example 6 | F | Ag | plate-like | 120 | 20 | 6.0 | 5 | PG | 27.6 | 188 | 600 | 0.35 |
| Example 10 | G | Au | plate-like | 170 | 9 | 18.9 | 5 | PG | 27.6 | 188 | 1000 | 0.21 |
| Comparative Example 7 | H | Al | plate-like | 600 | ND | ND | 6 | ND | ND | ND | none | 1 |
| Comparative Example 8 | I | Al | plate-like | 600 | ND | ND | 6 | ND | ND | ND | none | 1 |
| Comparative Example 9 | — | Ag | cubic | 609 | 540 | 1.1 | 7 | — | — | — | none | 1 |

| | Evaluation results (glossy paper) | | | | | |
|---|---|---|---|---|---|---|
| | | | | Specular glossiness of image | | |
| | Ejectability | Temporal stability | Tint of image | 20° gloss value | 60° gloss value | Sensory evaluation |
| Example 1 | AA | A | A | AA | AA | A |
| Example 2 | AA | A | S | AA | AA | AA |
| Example 3 | A | A | S | S | S | S |
| Example 4 | AA | A | A | A | A | A |
| Comparative Example 1 | AA | A | C | B | B | C |
| Example 5 | AA | A | A | A | A | A |
| Example 6 | AA | A | AA | AA | AA | AA |
| Example 7 | A | A | AA | S | S | S |
| Example 8 | AA | A | S | AA | AA | AA |
| Example 9 | AA | A | S | AA | AA | AA |
| Comparative Example 2 | AA | A | C | C | C | C |
| Comparative Example 3 | AA | A | C | C | C | C |

TABLE 2-continued

| | | | | | | |
|---|---|---|---|---|---|---|
| Comparative Example 4 | C | A | B | A | A | B |
| Comparative Example 5 | C | A | B | B | B | B |
| Comparative Example 6 | A | A | C | B | B | C |
| Example 10 | AA | A | B | A | A | A |
| Comparative Example 7 | B | D | AA | B | B | A |
| Comparative Example 8 | B | D | AA | B | B | A |
| Comparative Example 9 | C | D | AA | C | C | C |

Legend of Tables 2 to 5

"None" in the "Maximum absorption wavelength" column indicates that no apparent peaks were observed in the wavelength range of 300 nm to 2,500 nm and a maximum absorption wavelength could not be definitely determined. Absorbance ratio [500 nm/max] is the ratio of the absorbance at a wavelength of 500 nm to the absorbance at the maximum absorption wavelength. When "none" is given in the "Maximum absorption wavelength" column, the absorbance ratio [500 nm/max] is "1".
Organic solvents are as follows.

| | |
|---|---|
| PG | propylene glycol |
| GL | glycerol |
| EG | ethylene glycol |
| DEGmEE | diethylene glycol monoethyl ether |
| EGmBE | ethylene glycol monobutyl ether |
| MeOH | methanol |
| i-PrOH | isopropanol |

"ND" means No Data.

As shown in Table 2, in Examples 1 to 10, in each of which an ink that contained plate-like metal particles and an organic solvent having a boiling point of 150° C. or higher and a solubility parameter (SP value) of 24 MPa$^{1/2}$ or more and that had a maximum absorption wavelength in the wavelength range of 800 nm to 2,500 nm was used, the ink ejectability and the specular glossiness of an image were good, and the tint of an image was reduced.

By contrast, in Comparative Examples 1 and 6, in each of which the maximum absorption wavelength of the ink was located in the wavelength range of less than 800 nm, and Comparative Examples 2 and 3, in each of which the SP value of the organic solvent contained in the ink was less than 24 MPa$^{1/2}$, the tint of an image occurred.

In Comparative Examples 4 and 5, in each of which the boiling point of the organic solvent contained in the ink was less than 150° C., the ink ejectability was reduced.

In Comparative Examples 7 to 9, in each of which the ink had no apparent peaks in the wavelength range of 300 nm to 2,500 nm, the ink ejectability was reduced. The absence of apparent peaks in the wavelength range of 300 nm to 2,500 nm suggests that the inks of Comparative Examples 7 to 9 contained coarse metal particles. This is probably because the ink ejectability was reduced.

Image Formation and Evaluations (Substrate: Coated Paper)

In Examples 1 to 9 and Comparative Examples 7 to 9, the same procedures as described in the section of "Image Formation and Evaluations (Substrate: Glossy Paper)" were conducted except that as a substrate, coated paper ("OK Topcoat (registered trademark) Plus" available from Oji Paper Co., Ltd.) was used in place of the glossy paper (Kassai available from Fujifilm).

The results are shown in Table 3.

TABLE 3

| | Ink | | | | | | | | | | | | Evaluation results (coated paper) | | | |
|---|---|---|---|---|---|---|---|---|---|---|---|---|---|---|---|---|
| | Metal particles | | | | | | Organic solvent | | | Maximum absorption wavelength (nm) | Absorbance ratio [500 nm/max] | Tint of image | Specular glossiness of image | | | |
| | Dispersion | Metal | Shape | Average equivalent circle diameter (nm) | Average thickness (nm) | Average aspect ratio | Amount of ink [mass %] | Type | SP value (MPa$^{1/2}$) | Boiling point (° C.) | | | | 20° gloss value | 60° gloss value | Sensory evaluation |
| Example 1 | A | Ag | plate-like | 120 | 9 | 13.3 | 5 | PG | 27.6 | 188 | 850 | 0.12 | A | A | A | A |
| Example 2 | B | Ag | plate-like | 170 | 9 | 18.9 | 5 | PG | 27.6 | 188 | 1000 | 0.1 | S | A | A | A |
| Example 3 | C | Ag | plate-like | 220 | 9 | 24.4 | 5 | PG | 27.6 | 188 | 1300 | 0.08 | S | AA | AA | AA |
| Example 4 | D | Ag | plate-like | 220 | 12 | 18.3 | 5 | PG | 27.6 | 188 | 1000 | 0.25 | A | B | B | A |
| Example 5 | B | Ag | plate-like | 170 | 9 | 18.9 | 2.5 | PG | 27.6 | 188 | 1000 | 0.1 | A | B | B | A |

TABLE 3-continued

| | | Ink | | | | | | | | | | | | |
|---|---|---|---|---|---|---|---|---|---|---|---|---|---|---|
| | | Metal particles | | | | | | | | | | Evaluation results (coated paper) | | |
| | | | Average equivalent circle diameter (nm) | Average thickness (nm) | Average aspect ratio | Amount relative to the total amount of ink [mass %] | Organic solvent | | Maximum absorption wavelength (nm) | Absorbance ratio [500 nm/max] | | Specular glossiness of image | | |
| | | | | | | | Type | SP value (MPa$^{1/2}$) | Boiling point (° C.) | | | Tint of image | 20° gloss value | 60° gloss value | Sensory evaluation |
| Dispersion | Metal | Shape | | | | | | | | | | | | | |
| Example 6 | B | Ag | plate-like | 170 | 9 | 18.9 | 3.5 | PG | 27.6 | 188 | 1000 | 0.1 | A | A | A | A |
| Example 7 | B | Ag | plate-like | 170 | 9 | 18.9 | 6.5 | PG | 27.6 | 188 | 1000 | 0.1 | AA | AA | AA | AA |
| Example 8 | B | Ag | plate-like | 170 | 9 | 18.9 | 5 | GL | 33.8 | 290 | 1000 | 0.1 | S | A | A | A |
| Example 9 | B | Ag | plate-like | 170 | 9 | 18.9 | 5 | EG | 29.9 | 197 | 1000 | 0.1 | S | A | A | A |
| Comparative Example 7 | H | Al | plate-like | 600 | ND | ND | 6 | ND | ND | ND | none | 1 | AA | C | C | C |
| Comparative Example 8 | I | Al | plate-like | 600 | ND | ND | 6 | ND | ND | ND | none | 1 | AA | C | C | C |
| Comparative Example 9 | — | Ag | cubic | 609 | 540 | 1.1 | 7 | — | — | — | none | 1 | AA | C | C | C |

As shown in Table 3, when coated paper was used as a substrate, the inks of Examples 1 to 9 were able to form an image having high specular glossiness and being less tinted.

Image Formation and Evaluations (Substrate: PET Film)

In Examples 1 to 9 and Comparative Examples 7 to 9, the same procedures as described in the section of "Image Formation and Evaluations (Glossy Paper)" were conducted except that as a substrate, a polyethylene terephthalate (PET) film (A4300 available from Toyobo Co., Ltd.) was used in place of the ink jet paper (Kassai available from Fujifilm) and that an image, after being formed, was dried by heating for 60 minutes on a hot plate at 80° C.

The results are shown in Table 4.

TABLE 4

| | | Ink | | | | | | | | | | | | |
|---|---|---|---|---|---|---|---|---|---|---|---|---|---|---|
| | | Metal particles | | | | | | | | | | Evaluation results (PET film) | | |
| | | | Average equivalent circle diameter (nm) | Average thickness (nm) | Average aspect ratio | Amount relative to the total amount of ink [mass %] | Organic solvent | | Maximum absorption wavelength (nm) | Absorbance ratio [500 nm/max] | | Specular glossiness of image | | |
| | | | | | | | Type | SP value (MPa$^{1/2}$) | Boiling point (° C.) | | | Tint of image | 20° gloss value | 60° gloss value | Sensory evaluation |
| Dispersion | Metal | Shape | | | | | | | | | | | | | |
| Example 1 | A | Ag | plate-like | 120 | 9 | 13.3 | 5 | PG | 27.6 | 188 | 850 | 0.12 | A | S | AA | AA |
| Example 2 | B | Ag | plate-like | 170 | 9 | 18.9 | 5 | PG | 27.6 | 188 | 1000 | 0.1 | S | S | AA | AA |
| Example 3 | C | Ag | plate-like | 220 | 9 | 24.4 | 5 | PG | 27.6 | 188 | 1300 | 0.08 | S | S | AA | S |
| Example 4 | D | Ag | plate-like | 220 | 12 | 18.3 | 5 | PG | 27.6 | 188 | 1000 | 0.25 | A | AA | AA | A |
| Example 5 | B | Ag | plate-like | 170 | 9 | 18.9 | 2.5 | PG | 27.6 | 188 | 1000 | 0.1 | A | A | A | A |
| Example 6 | B | Ag | plate-like | 170 | 9 | 18.9 | 3.5 | PG | 27.6 | 188 | 1000 | 0.1 | A | AA | A | AA |
| Example 7 | B | Ag | plate-like | 170 | 9 | 18.9 | 6.5 | PG | 27.6 | 188 | 1000 | 0.1 | AA | S | S | S |
| Example 8 | B | Ag | plate-like | 170 | 9 | 18.9 | 5 | GL | 33.8 | 290 | 1000 | 0.1 | S | S | AA | S |

TABLE 4-continued

| | Ink | | | | | | | | | | | | | | |
|---|---|---|---|---|---|---|---|---|---|---|---|---|---|---|---|
| | Metal particles | | | | | | | | | | | | Evaluation results (PET film) | | |
| | | | | Average equivalent circle diameter (nm) | Average thickness (nm) | Average aspect ratio | Amount relative to the total amount of ink [mass %] | Organic solvent | | Boiling point (° C.) | Maximum absorption wavelength (nm) | Absorbance ratio [500 nm/max] | | Specular glossiness of image | |
| | Dispersion | Metal | Shape | | | | | Type | SP value (MPa$^{1/2}$) | | | | Tint of image | 20° gloss value | 60° gloss value | Sensory evaluation |
| Example 9 | B | Ag | plate-like | 170 | 9 | 18.9 | 5 | EG | 29.9 | 197 | 1000 | 0.1 | S | S | AA | S |
| Comparative Example 7 | H | Al | plate-like | 600 | ND | ND | 6 | ND | ND | ND | none | 1 | AA | B | B | B |
| Comparative Example 8 | I | Al | plate-like | 600 | ND | ND | 6 | ND | ND | ND | none | 1 | AA | B | B | B |
| Comparative Example 9 | — | Ag | cubic | 609 | 540 | 1.1 | 7 | — | — | — | none | 1 | AA | C | C | C |

As shown in Table 4, when a PET film was used as a substrate, the inks of Examples 1 to 9 were able to form an image having high specular glossiness and being less tinted.

Examples 11 to 13

Inks were prepared in the same manner as in Example 1 except that silver ion trapping agents shown in Table 5 were further added to the composition of ink.

In the inks of Examples 11 to 13, the silver ion trapping agent content was 10% by mass relative to the plate-like metal particle content.

Comparative Example 14

Inks were prepared in the same manner as in Comparative Example 7 except that silver ion trapping agents shown in Table 5 were further added to the composition of ink.

In the ink of Comparative Example 14, the silver ion trapping agent content was 10% by mass relative to the plate-like metal particle content.

Image Formation Using Ink After Two Months and Evaluations (Substrate: Glossy Paper)

The inks of Examples 1 and 11 to 13 and Comparative Example 14 were left to stand at 60° C. for two months. Hereinafter, the ink left to stand for two months is referred to as the "ink after two months".

Using the inks after two months of Examples 1 and 11 to 13 and Comparative Example 14, the same procedures as in the section of "Image Formation and Evaluations (Substrate: Glossy Paper)" of Example 1, excluding the procedure of "temporal ink stability", were conducted.

The results are shown in Table 5.

TABLE 5

| | Ink | | | | | | | | | | | | | | |
|---|---|---|---|---|---|---|---|---|---|---|---|---|---|---|---|
| | Metal particles | | | | | | | | | | Maximum absorption wavelength (nm) | Absorbance ratio [500 nm/max] | Silver ion trapping agent | pK$_{sp}$ |
| | Dispersion | Metal | Shape | Average equivalent circle diameter (nm) | Average thickness (nm) | Average aspect ratio | Amount relative to the total amount of ink [mass %] | Organic solvent | | Boiling point (° C.) | | | | |
| | | | | | | | | Type | SP value (MPa$^{1/2}$) | | | | | |
| Example 1 | A | Ag | plate-like | 120 | 9 | 13.3 | 5 | PG | 27.6 | 188 | 850 | 0.12 | none | — |
| Example 11 | A | Ag | plate-like | 120 | 9 | 13.3 | 5 | PG | 27.6 | 188 | 850 | 0.12 | (T-1) | 13.8 |
| Example 12 | A | Ag | plate-like | 120 | 9 | 13.3 | 5 | PG | 27.6 | 188 | 850 | 0.12 | (T-2) | 17.5 |
| Example 13 | A | Ag | plate-like | 120 | 9 | 13.3 | 5 | PG | 27.6 | 188 | 850 | 0.12 | (T-3) | 19 |
| Comparative Example 14 | H | Al | plate-like | 600 | ND | ND | 6 | ND | ND | ND | none | 1 | (T-3) | 19 |

| | Evaluation results of ink after two months (coated paper) | | | | |
|---|---|---|---|---|---|
| | | | Specular glossiness of image | | |
| | Ejectability | Tint of image | 20° gloss value | 60° gloss value | Sensory evaluation |
| Example 1 | AA | B | B | B | B |
| Example 11 | AA | A | A | A | A |

TABLE 5-continued

| | | | | | |
|---|---|---|---|---|---|
| Example 12 | AA | A | AA | AA | A |
| Example 13 | AA | AA | AA | AA | AA |
| Comparative Example 14 | D | — | — | — | — |

Silver ion trapping agents (compounds T-1 to T-3) in Table 5 are as shown below.

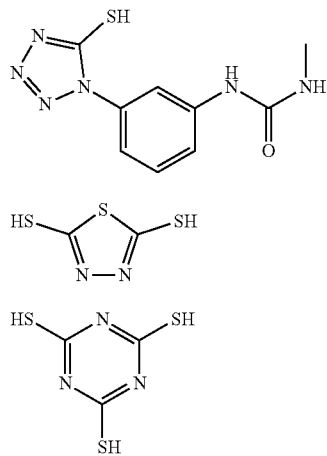

As shown in Table 5, the ink after two months of Example 1 retained the effect of improvement in the specular glossiness of an image and the effect of reduction in the tint of an image so as to be suitable for practical use.

The effect of improvement in the specular glossiness of an image and the effect of reduction in the tint of an image of the inks after two months of Examples 11 to 13, which included silver ion trapping agents, were superior to those of the ink after two months of Example 1.

Comparative Example 14 was unevaluable because of the occurrence of nozzle clogging.

The disclosures of JP2016-037731, filed on Feb. 29, 2016, and JP2016-107303, filed on May 30, 2016, are incorporated herein by reference in their entireties.

All documents, patent applications, and technical standards mentioned in this specification are incorporated herein by reference to the same extent as if each individual document, patent application, or technical standard was specifically and individually indicated to be incorporated by reference.

What is claimed is:

1. An ink composition used for image formation by an ink jet method,
    the ink composition comprising plate-like metal particles and an organic solvent having a boiling point of 150° C. or higher and a solubility parameter of 24 MPa$^{1/2}$ or more,
    wherein a maximum absorption wavelength of the ink composition in a wavelength range of 300 nm to 2,500 nm is located in a wavelength range of 800 nm to 2,500 nm.

2. The ink composition according to claim 1, wherein the plate-like metal particles include a metal element having a standard oxidation-reduction potential nobler than −1.65 V.

3. The ink composition according to claim 1, wherein the plate-like metal particles include at least one metal element selected from the group consisting of gold, silver, and platinum.

4. The ink composition according to claim 1, wherein the plate-like metal particles include silver in an amount of 80% by mass or more relative to the total amount of the plate-like metal particles.

5. The ink composition according to claim 1, wherein the plate-like metal particles have an average aspect ratio, which is a ratio of an average equivalent circle diameter to an average thickness, of 10 or more.

6. The ink composition according to claim 1, wherein the plate-like metal particles have an average equivalent circle diameter of 10 nm to 300 nm.

7. The ink composition according to claim 1, wherein a content of the plate-like metal particles is 3% to 10% by mass relative to the total amount of the ink composition.

8. The ink composition according to claim 1, wherein a content of the organic solvent is 5% to 80% by mass relative to the total amount of the ink composition.

9. The ink composition according to claim 1, wherein a ratio of an absorbance at a wavelength of 500 nm to an absorbance at the maximum absorption wavelength is 0.2 or less.

10. The ink composition according to claim 1, further comprising water.

11. The ink composition according to claim 10, further comprising gelatin.

12. The ink composition according to claim 11, wherein a ratio of a mass content of the plate-like metal particles to a mass content of the gelatin is 1 to 100.

13. The ink composition according to claim 1, wherein the organic solvent is at least one selected from the group consisting of propylene glycol, glycerol, and ethylene glycol.

14. The ink composition according to claim 1, further comprising a silver ion trapping agent having a pK$_{sp}$ of 13 or more,
    wherein the plate-like metal particles include silver,
    pK$_{sp}$ being defined by formula (1):

$$pK_{sp} = -\log K_{sp} \quad \text{formula (1)}$$

wherein K$_{sp}$ represents a solubility product of a silver salt at 25° C.

15. The ink composition according to claim 14, wherein the silver ion trapping agent is an organic compound including at least one of a mercapto group or a nitrogen-containing heterocyclic structure.

16. The ink composition according to claim 1, wherein the ink composition is used for decorative printing by an ink jet method.

17. An image forming method comprising an ink application step of applying the ink composition according to claim 1 to a substrate by an ink jet method.

* * * * *